(12) United States Patent
Katayama et al.

(10) Patent No.: US 7,886,025 B2
(45) Date of Patent: Feb. 8, 2011

(54) INFORMATION PROCESSING UNIT, SYSTEM, REMOTE CONTROL METHOD, AND STORAGE MEDIUM

(75) Inventors: Shinichi Katayama, Shinagawa (JP); Naoyuki Nagao, Shinagawa (JP); Kenichi Fujita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 899 days.

(21) Appl. No.: 11/039,944

(22) Filed: Jan. 24, 2005

(65) Prior Publication Data

US 2005/0179666 A1    Aug. 18, 2005

(30) Foreign Application Priority Data

Feb. 18, 2004    (JP) ............... 2004-041867

(51) Int. Cl.
G06F 15/16    (2006.01)
(52) U.S. Cl. ..................................... 709/219
(58) Field of Classification Search ................. 709/223, 709/226, 219; 345/168
See application file for complete search history.

(56) References Cited

U.S. PATENT DOCUMENTS

| | | | | |
|---|---|---|---|---|
| 5,878,248 | A * | 3/1999 | Tehranian et al. ........... | 345/502 |
| 6,437,803 | B1 * | 8/2002 | Panasyuk et al. ............ | 715/733 |
| 6,557,170 | B1 * | 4/2003 | Wilder et al. ................ | 725/130 |
| 6,681,250 | B1 * | 1/2004 | Thomas et al. .............. | 709/226 |
| 6,859,928 | B2 * | 2/2005 | Wright ........................ | 718/102 |
| 2002/0066031 | A1 | 5/2002 | Seki et al. | |

FOREIGN PATENT DOCUMENTS

| JP | 2001-344189 | 12/2001 |
|---|---|---|
| JP | 2002-169632 | 6/2002 |
| JP | 2003-534685 | 11/2003 |

OTHER PUBLICATIONS

Japanese Office Action issued Nov. 17, 2009 in the corresponding Japanese Patent Application 2004-041867 (4 pages) English Translation (5 pages).

* cited by examiner

*Primary Examiner*—Kenny S Lin
*Assistant Examiner*—Farhad Ali
(74) *Attorney, Agent, or Firm*—Staas & Halsey LLP

(57) ABSTRACT

An information processing unit for operating a server on a network by remote control includes a key code receiving unit that obtains a key code outputted from a keyboard and saves the key code in a memory, before an operating system obtains the key code, a key code control unit that interrupts a transmission of the key code to the operating system, and a communication unit that transmits the key code saved in the memory to the server. It is thus possible to send the key code outputted from the keyboard or the pointing device data outputted from the pointing device to a KVM device on a network without sending to the OS. In addition, it is possible to directly send the key code outputted from the keyboard or the pointing device data outputted from the pointing device to the application that runs on the OS, instead of sending to the OS. It is thus possible to send a special key to the servers without being affected by another application that is monitoring any key input.

17 Claims, 22 Drawing Sheets

190 SCREEN DISPLAY AREA

INFORMATION PROCESSING UNIT, SYSTEM, REMOTE CONTROL METHOD, AND STORAGE MEDIUM

BACKGROUND OF THE INVENTION

1. Field of the Invention

This invention relates to an information processing unit, system, remote control method, and storage medium.

2. Description of the Related Art

Conventionally, a networked KVM (Keyboard-Video-Mouse) device has been employed for switching between multiple servers on a network. FIG. 1 is a block diagram of a system for operating multiple servers with the use of conventional networked KVM devices.

Referring to FIG. 1, a system 20 has a console PC 1, networked KVM devices 2 and 3, servers 4 through 9, a keyboard 10, a pointing device 11, and a communication device 12. One console PC 1 is connected to the networked KVM devices 2 and 3 via a network 13. The servers 4, 5, and 6 are connected to the networked KVM device 2. The servers 7, 8, and 9 are connected to the networked KVM device 3.

The keyboard 10 and the pointing device 11 are connected to the console PC 1, as input devices. IP addresses are assigned to the networked KVM devices 2 and 3 respectively. The console PC 1 communicates with one of the networked KVM devices 2 and 3 across the network by using protocols such as TCP/IP or the like, and selects one of the servers 4 through 9 for the server to be operated by the console PC 1 based on a specific select operation.

A description will be given of the internal configuration of the console PC 1 as shown in FIG. 1. FIG. 2 shows an internal configuration of the conventional console PC 1. Referring to FIG. 2, the console PC 1 includes an operating system 30 (hereinafter simply referred to as OS) and an application 40. Hereinafter, the same components and configurations as those of FIG. 1 have the same reference numerals and a detailed explanation will be omitted. Application 40 has a key code receiving unit 41, a pointing device data receiving unit 42, a server communication unit 43, and a memory 44.

When one of the keyboard 10 and the pointing device 11 is manipulated, the key code receiving unit 41 running on the application 40 obtains a key code outputted from the keyboard 10 or pointing device data outputted from the pointing device 11 through the OS 30, and stores in the memory 44. The server communication unit 43 reads out the key code or the pointing device data from the memory 44, and sends the key code or the data to the networked KVM devices 2 or 3, by using TCP/IP protocols. The selected server from the servers 4 through 9 is connected to one of the networked KVM devices 2 and 3. The networked KVM devices 2 or 3 receives the data, and sends the key code outputted from the keyboard 10 or the pointing device data outputted from the pointing device 11 to the selected server. Thus, the selected server can be operated from the PC 1. Next, a description will be given of a conventional networked KVM device.

A networked KVM device disclosed in Japanese Patent Application Publication No. 2001-344189 enables to communicate between a workstation and a server, after a given server is connected to the network, based on the server select operation from the workstation. Thus, multiple computers can be operated by other computers remotely.

However, the key code outputted from the keyboard 10 that is connected to the console PC 1 is obtained through the application 40 running in a user mode. If there is another application that is monitoring any key input on the console PC 1, said another application becomes active while the application 40 is monitoring the key input and carrying out an operation by remote control. As a result, there arises a problem in that the application 40 is not active any longer, and the key code or the pointing device data is not sent to the selected server.

Besides, there are applications having button GUIs (Graphical User Interface) or the like that send special keys to the selected server. However, in the case where the special key is sent with the use of the button GUI, it is required to input with the use of a mouse, which is not an ordinary key operation. As a result, there is a problem in that it is difficult to perform a continuous inputting operation with a keyboard. Further, more buttons or the like are required on the GUI for the application, as the number of special keys to be sent to the server increases.

SUMMARY OF THE INVENTION

The present invention has been made in view of the above circumstances and provides an information processing unit, system, remote operation, and program product or a computer readable storage medium without affected by another application.

In an aspect of the present invention, an information processing unit for operating a server on a network by remote control, the information processing unit may include a key code receiving unit that obtains a key code outputted from a keyboard and saves the key code in a memory, before an operating system obtains the key code, a key code control unit that interrupts a transmission of the key code to the operating system, and a communication unit that transmits to the server, the key code saved in the memory.

In another aspect of the present invention, the information processing unit for operating a server on a network by remote control, the information processing unit may include a pointing device data receiving unit that obtains pointing device data outputted from a pointing device and saves the pointing device data in a memory, before an operating system obtains the pointing device data, a pointing device data control unit that interrupts a transmission of the pointing device data to the operating system, and a communication unit that transmits to the server, the pointing device data saved in the memory.

In another aspect of the present invention, a system may include a plurality of servers, and an information processing unit for operating the plurality of servers by remote control via a network, the information processing unit may include a key code receiving unit that obtains a key code outputted from a keyboard and saves the key code in a memory, before an operating system obtains the key code, a communication unit that transmits to the server, the key code saved in the memory, and a key code control unit that interrupts a transmission of the key code to the operating system.

In another aspect of the present invention, a system may include a plurality of servers, and an information processing unit for operating the plurality of servers by remote control via a network. The information processing unit may include a pointing device data receiving unit that obtains pointing device data outputted from a pointing device and saves the pointing device data in a memory, before an operating system obtains the pointing device data, a communication unit that transmits to the server, the pointing device data saved in the memory, and a pointing device data control unit that interrupts a transmission of the pointing device data to the operating system.

In another aspect of the present invention, an operation method of a server on a network by remote control may include the steps of obtaining a key code outputted from a keyboard to save the key code in a memory, before an operating system obtains the key code, interrupting a transmission of the key code to the operating system, and transmitting to the server, the key code saved in the memory.

In another aspect of the present invention, an operation method of a server on a network by remote control may include the steps of obtaining pointing device data outputted from a pointing device to save the pointing device data in a memory, before an operating system obtains the pointing device data, interrupting a transmission of the pointing device data to the operating system, and transmitting to the server, the pointing device data saved in the memory.

In another aspect of the present invention, a storage medium readable by a computer to operate a server on a network by remote control, the storage medium may include means for obtaining a key code outputted from a keyboard to save the key code in a memory, before an operating system obtains the key code, means for interrupting a transmission of the key code to the operating system, and means for transmitting to the server, the key code saved in the memory.

In another aspect of the present invention, a storage medium readable by a computer to operate a server on a network by remote control, the storage medium may include means for obtaining pointing device data outputted from a pointing device to save the pointing device data in a memory, before an operating system obtains the pointing device data, means for interrupting a transmission of the pointing device data to the operating system, and means for transmitting to the server, the pointing device data saved in the memory.

BRIEF DESCRIPTION OF THE DRAWINGS

Preferred embodiments of the present invention will be described in detail based on the following figures, wherein.

DESCRIPTION OF THE PREFERRED EMBODIMENTS

A description will now be given, with reference to the accompanying drawings, of embodiments of the present invention.

First Embodiment

Figure 1:
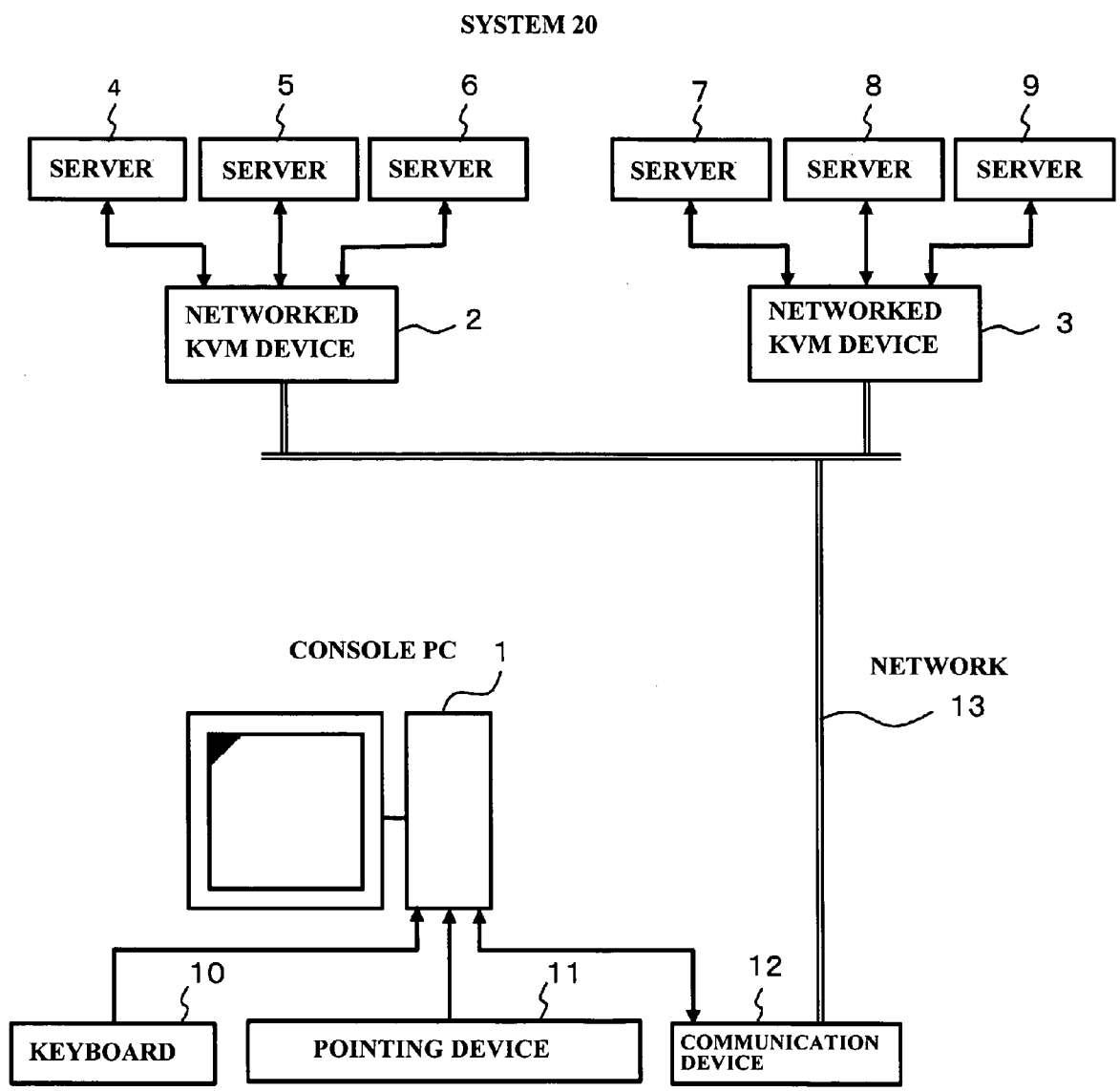
FIG. 1 is a block diagram of a system for operating multiple servers with the use of conventional networked KVM devices.
Figure 2:
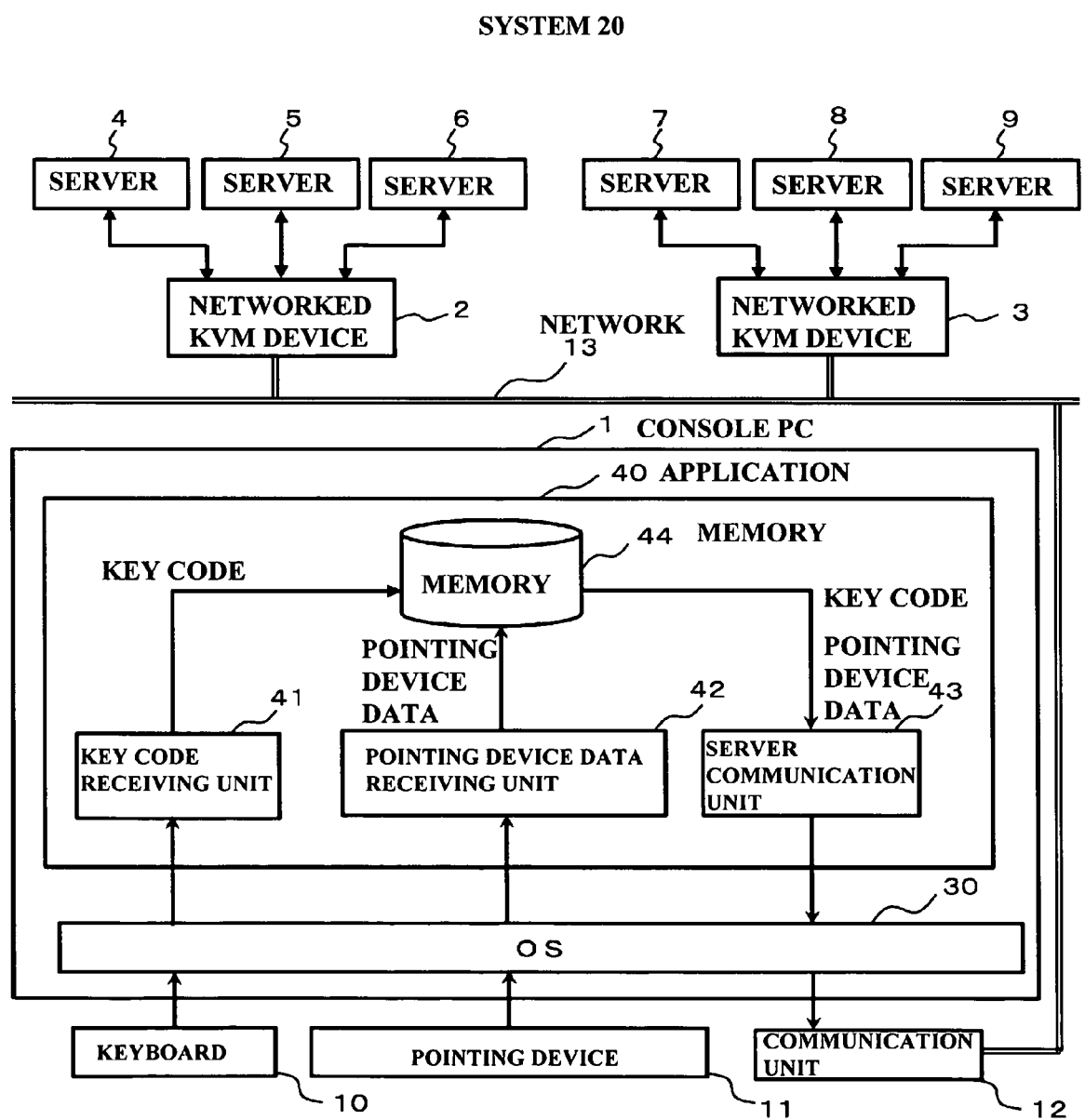
FIG. 2 shows an internal configuration of the conventional console PC 1.
Figure 3:
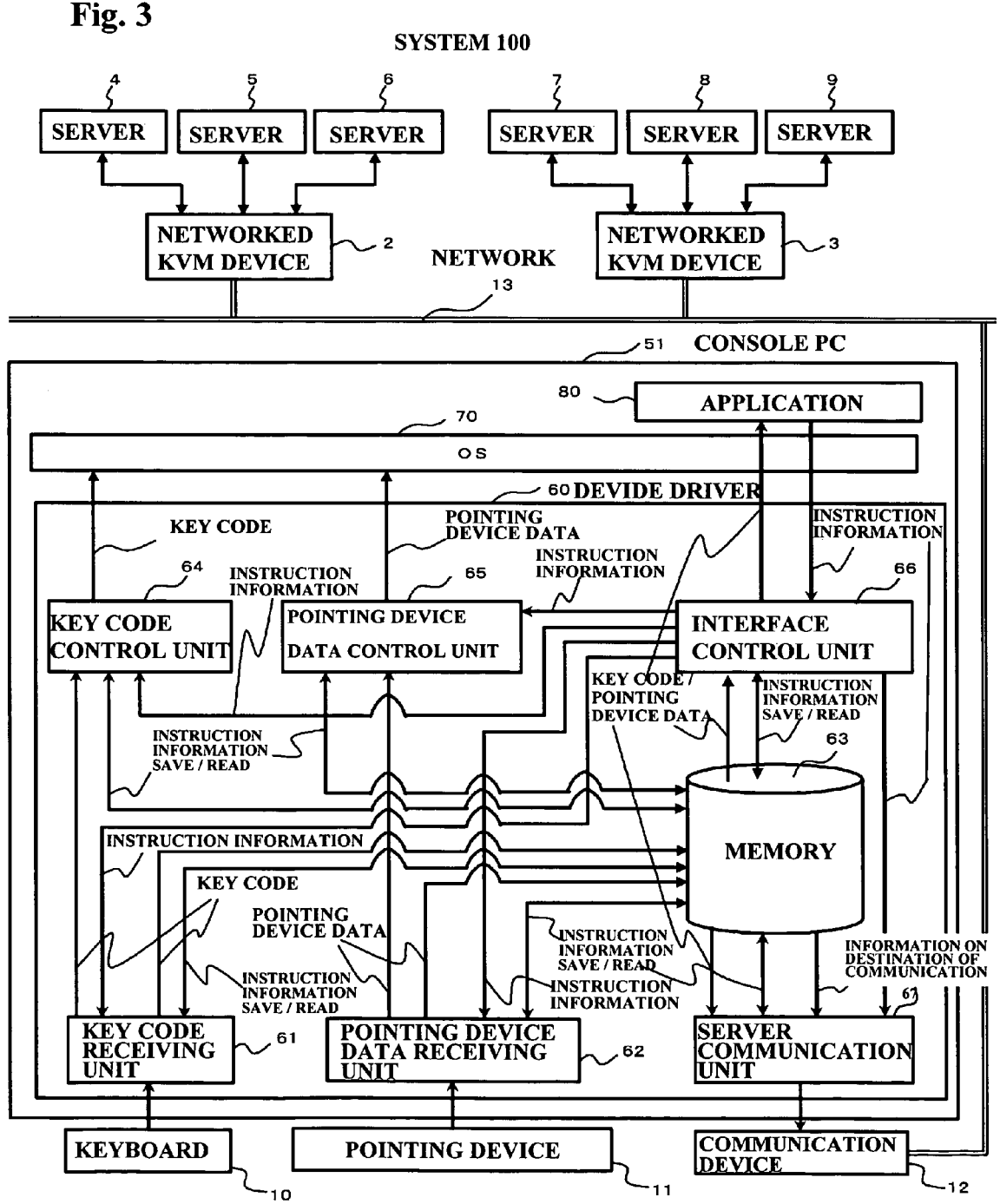
FIG. 3 is a block diagram of a system 100 in accordance with a first embodiment of the present invention.

FIG. 3 is a block diagram of a system 100 in accordance with a first embodiment of the present invention. Referring to FIG. 3, the system 100 has a console PC 51, a networked KVM devices 2 and 3, servers 4 through 9, a keyboard 10, a pointing device 11 such as a mouse or the like, and a communication device 12.

The console PC 51 is used for operating the servers 4 through 9 that reside on the network, by remote control. The consoled PC 51 includes a device driver 60, an OS 70, and an application 80. The console PC 51 is configured with a CPU (Central Processing Unit), a ROM (Read Only memory), a RAM (Random Access Memory), and the like. The console PC 51 may be configured with a KVM device with the capability of switching between multiple computers.

The device driver 60 includes a key code receiving unit 61, a pointing device data receiving unit 62, a memory 63, a key code control unit 64, a pointing device data control unit 65, an interface 66, and a server communication unit 67. The instruction information is capable of changing the operations of the key code receiving unit 61, the pointing device data receiving unit 62, the key code control unit 64, the pointing device data control unit 65, the interface control unit 66, and the server communication unit 67 The above-mentioned instruction information is outputted from the application 60.

The instruction information here includes the information for giving instructions to the respective modules of the key code receiving unit 61, the pointing device data receiving unit 62, the key code control unit 64, the pointing device data control unit 65, the interface 66, and the server communication unit 67. In particular, the instruction information for designating the operation of the key code receiving unit 61 has two different pieces of the instruction information: a request to start saving key code and a request to end saving key code. Those two requests are exclusively used.

There are multiple applications including the application 80 that reside on the OS 70. Those applications monitor any key input from the keyboard 10 and the pointing device 11. The application 80 is used for remotely operating the servers 4 through 9 via the network 13.

Next, a description will be given of the key code receiving unit 61. The key code receiving unit 61 obtains a key code outputted from the keyboard 10, before the OS 70 obtains the key code. The key code receiving unit 61 has following capabilities including the capability of storing the key code in the memory 63. The key code receiving unit 61 receives the key code transmitted from the keyboard 10, stores the key code received from the keyboard 10 in the memory 63, sends the key code received from the keyboard 10 to the key code control unit 64, receives the instruction information transmitted from the interface control unit 66, stores the instruction information received from the interface control unit 66 in the memory 63, reads out the instruction information stored in the memory 63, sends the key code received from the keyboard 10 to the key code control unit 64, and switches on and off to store the key code in the memory 63, according to the instruction information from the interface control unit 66.

Figure 4:
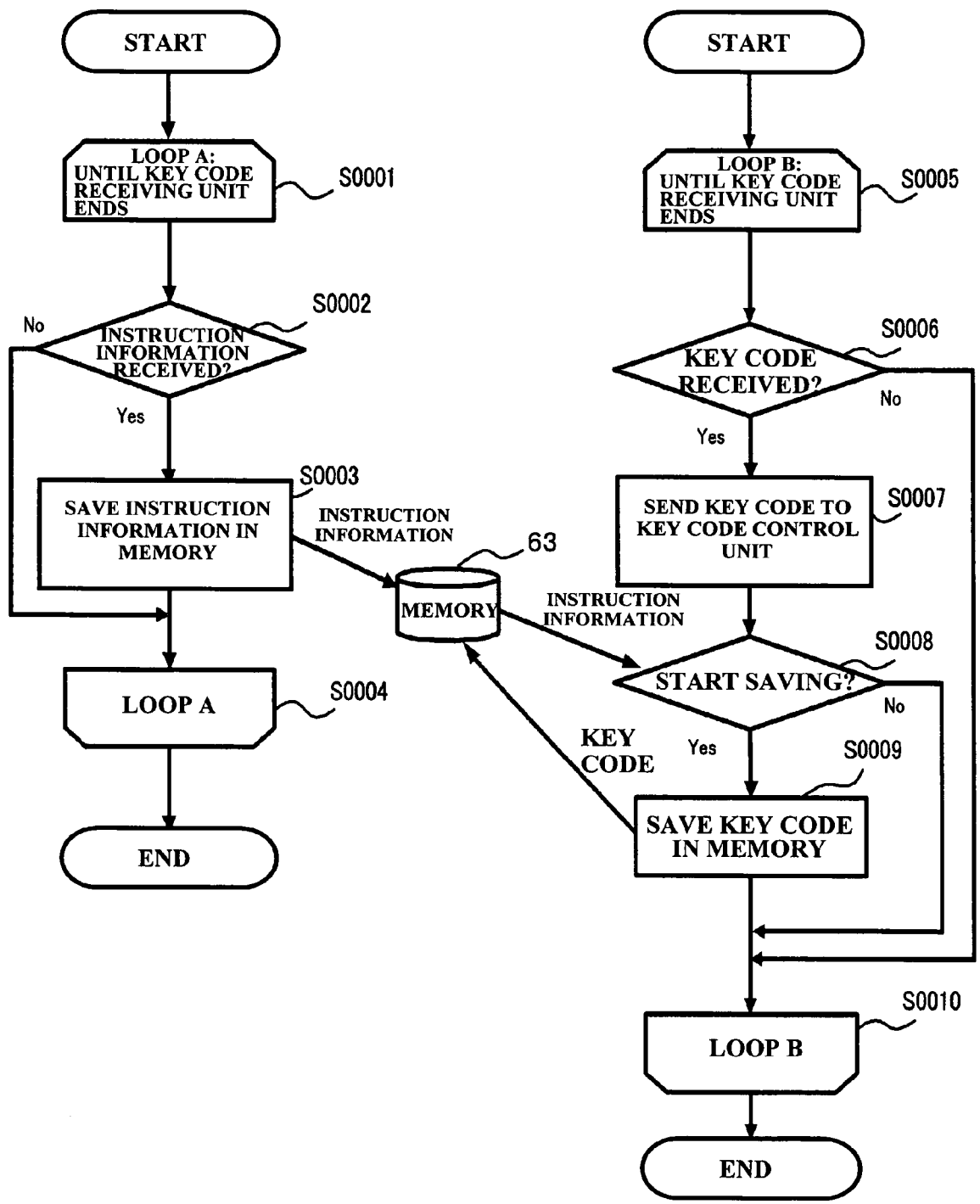
FIG. 4 is a flowchart describing a process flow of a key code receiving unit 61.

FIG. 4 is a flowchart describing a process flow of the key code receiving unit 61. The process flow of the key code receiving unit 61 is composed of steps S0001 through S0004 and steps S0005 through S0010. The steps S0001 through S0004 describe the process flow of the instruction information from the interface control unit 66, and steps S0005 through S0010 describe the process flow of the key code from the keyboard 10. The steps S0001 through S0004 and the steps S0005 through S0010 operate independently. First, a description will be given of the process flow of the instruction information outputted from the interface control unit 66. In step S0002, the key code receiving unit 61 stands by until the instruction information is sent from the interface control unit 66. In step S0003, the instruction information received from the interface control unit 66 is stored in the memory 63.

A description will now be given of the process flow of the key code outputted from the keyboard 10. In step S0006, the key code receiving unit 61 stands by until the key code is received from the keyboard 10. In step S0007, the key code received from the keyboard 10 is sent to the key code control unit 64. In step S0008, the key code receiving unit 61 reads out the instruction information from the memory 63, and checks whether the read-out instruction information is the request to start saving key code or the request to end saving key code. The request to start saving key code and the request to end saving key code are mutually exclusive. If it is the request to start saving key code, the key code received from the keyboard 10 is stored in the memory 63 in step S0009. If it is the request to end saving key code, the key code received from the keyboard 10 is not stored in the memory 63.

A description will now be given of the pointing device data receiving unit 62. The pointing device data receiving unit 62 obtains the pointing device data outputted from the pointing device 11 before the OS 70 obtains the pointing device data. The pointing device data receiving unit 62 has following capabilities including the capability of storing the pointing device data in the memory 63.

The pointing device data receiving unit 62 receives the pointing device data outputted from the pointing device 11, stores the pointing device data received from the pointing device 11 in the memory 63, sends the pointing device data received from the pointing device 11 to the pointing device data control unit 65, receives the instruction information sent from the interface control unit 66, stores the instruction information received from the interface control unit 66 in the memory 63, reads out the instruction information stored in the memory 63, sends the pointing device data received from the pointing device 11 to the pointing device data control unit 65, and switches on and off to store the pointing device data in the memory 63, according to the instruction information from the interface control unit 66.

Figure 5:
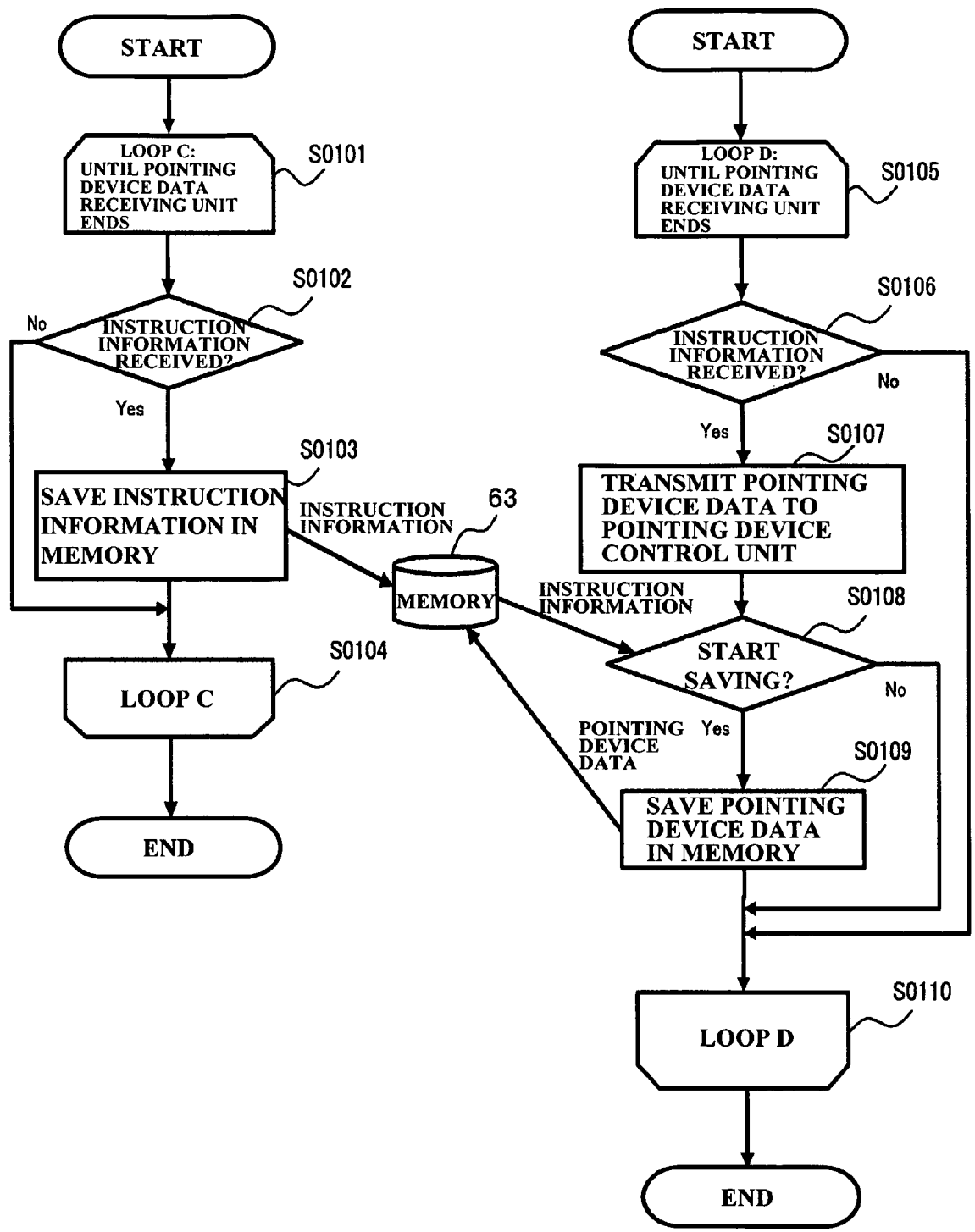
FIG. 5 is a flowchart describing a process flow of a pointing device data receiving unit 62.

FIG. 5 is a flowchart describing a process flow of the pointing device data receiving unit 62. The process flow of the pointing device data receiving unit 62 is composed of steps S0101 through S0104 and steps S0105 through S0110. The steps S0101 through S0104 describe the process flow of the instruction information from the interface control unit 66, and steps S0105 through S0110 describe the process flow of the pointing device data from the pointing device 11. The steps S0101 through S0104 and the steps S0105 through S0110 operate independently. First, a description will be given of the process flow of the instruction information from the interface control unit 66. In step S0102, the pointing device data receiving unit 62 stands by until the instruction information is sent from the interface control unit 66. In step S0103, the instruction information received from the interface control unit 66 is stored in the memory 63.

A description will now be given of the process flow of the pointing device data outputted from the pointing device 11. In step S0106, the pointing device data receiving unit 62 stands by until the pointing device data is received from the pointing device 11. In step S0107, the pointing device data received from the pointing device 11 is sent to the pointing device data control unit 65. In step S0108, the pointing device data receiving unit 62 reads out the instruction information from the memory 63, and checks whether the read-out information is a request to start saving pointing device data or a request to end saving pointing device data.

The request to start saving pointing device data and the request to end saving pointing device data are mutually exclusive. If it is the request to start saving pointing device data, the pointing device data received from the pointing device 11 is stored in the memory 63 in step S0109. If it is the request to end saving pointing device data, the pointing device data received from the pointing device 11 is not stored in the memory 63.

Next, a description will now be given of the key code control unit 64. The key code control unit 64 has following capabilities including the capability of interrupting a key code transmission to the OS 70. The key code control unit 64 receives the key code transmitted from the key code receiving unit 61, interrupts the transmission of the key code that has been received from the key code receiving unit 61 to the OS 70, receives the instruction information transmitted from the interface control unit 66, stores the instruction information received from the interface control unit 66 in the memory 63, reads out the instruction information stored in the memory 63, switches on and off to transmit the key code that has been received from the key code receiving unit 61 to the OS 70, according to the instruction information from the interface control unit 66.

Figure 6:
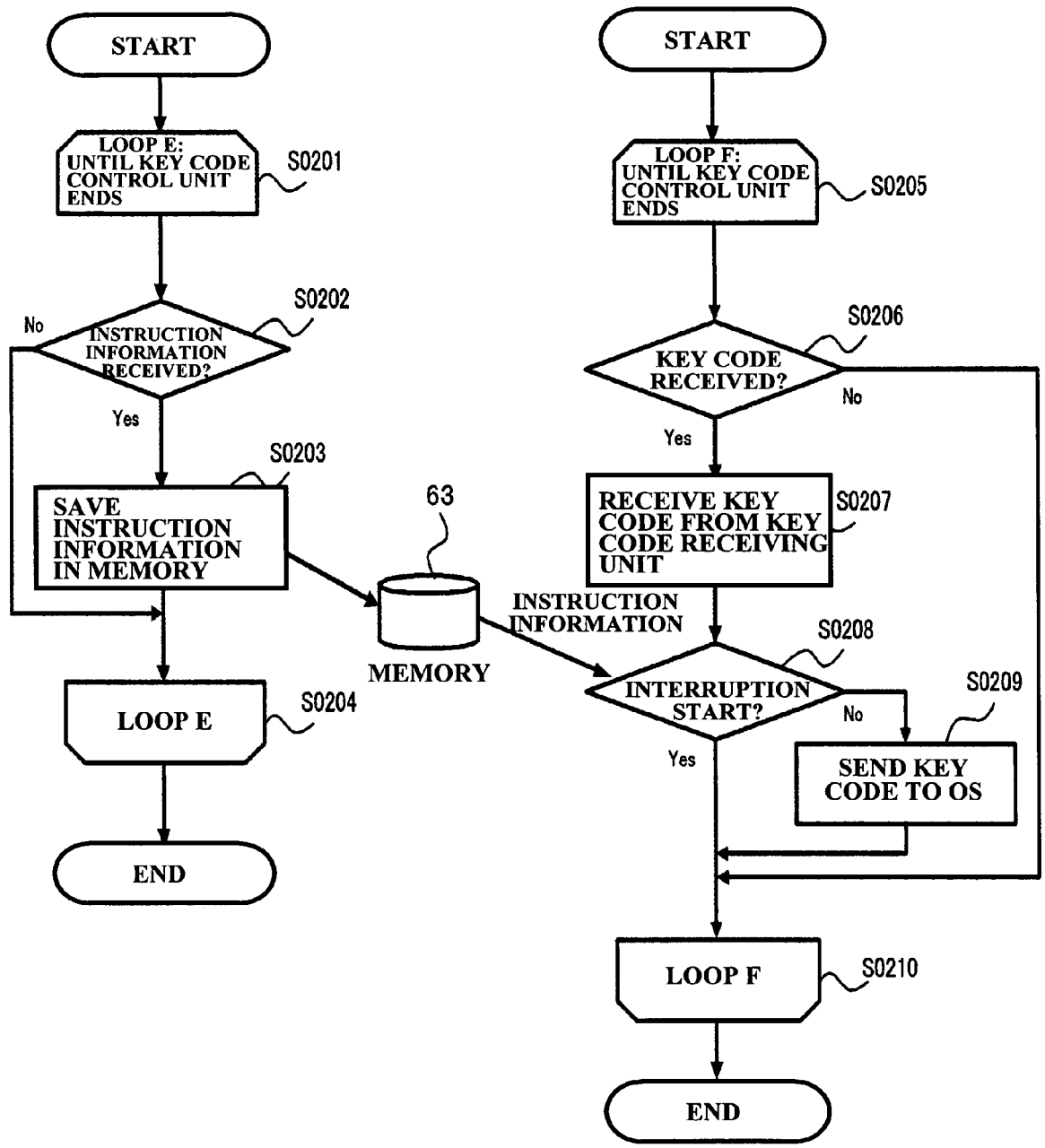
FIG. 6 is a flowchart describing a process flow of a key code control unit 64.

FIG. 6 is a flowchart describing a process flow of the key code control unit 64. The process flow of the key code control unit 64 is composed of steps S0201 through S0204 and steps S0205 through S0210. The steps S0201 through S0204 describe the process flow of the instruction information from the interface control unit 66, and the steps S0205 through S0210 describe the process flow of the key code sent from the key code receiving unit 61. The steps S0201 through S0204 and the steps S0205 through S0210 operate independently. First, a description will be given of the process flow of the instruction information from the interface control unit 66. In step S0202, the key code control unit 64 stands by until the instruction information is sent from the interface control unit 66. In step S0203, the instruction information received from the interface control unit 66 is stored in the memory 63.

A description will now be given of the process flow of the key code sent from the key code receiving unit 61. In step S0206, the key code control unit 64 stands by until the key code is received from the key code receiving unit 61. In step S0207, the key code is received from the key code control unit 64. In step S0208, the instruction information is read out from the memory 63, and it is checked whether the read-out information is a request to start interrupting key code or a request to end interrupting key code. The request to start interrupting key code and the request to end interrupting key code are mutually exclusive. If it is the request to start interrupting key code, the transmission of the key code that has been received from the key code receiving unit 61 to the OS 70 is interrupted. If it is the request to end interrupting key code, the key code received from the key code receiving unit 61 is transmitted to the OS 70 in step S0209.

Next, a description will now be given of the pointing device data control unit 65. The pointing device data control unit 65 has following capabilities including the capability of interrupting the transmission of the pointing device data to the OS 70.

The pointing device data control unit 65 receives the pointing device data that has been transmitted from pointing device data receiving unit 62, interrupts the transmission to the OS 70 of the pointing device data that has been received from the pointing device data receiving unit 62, receives the instruction information transmitted from the interface control unit 66, stores the instruction information that has been received from the interface control unit 66 in the memory 63, reads out the instruction information stored in the memory 63, and switches on and off to transmit to the OS 70, the pointing device data received from the pointing device data receiving unit 62, according to the instruction information from the interface control unit 66.

Figure 7:
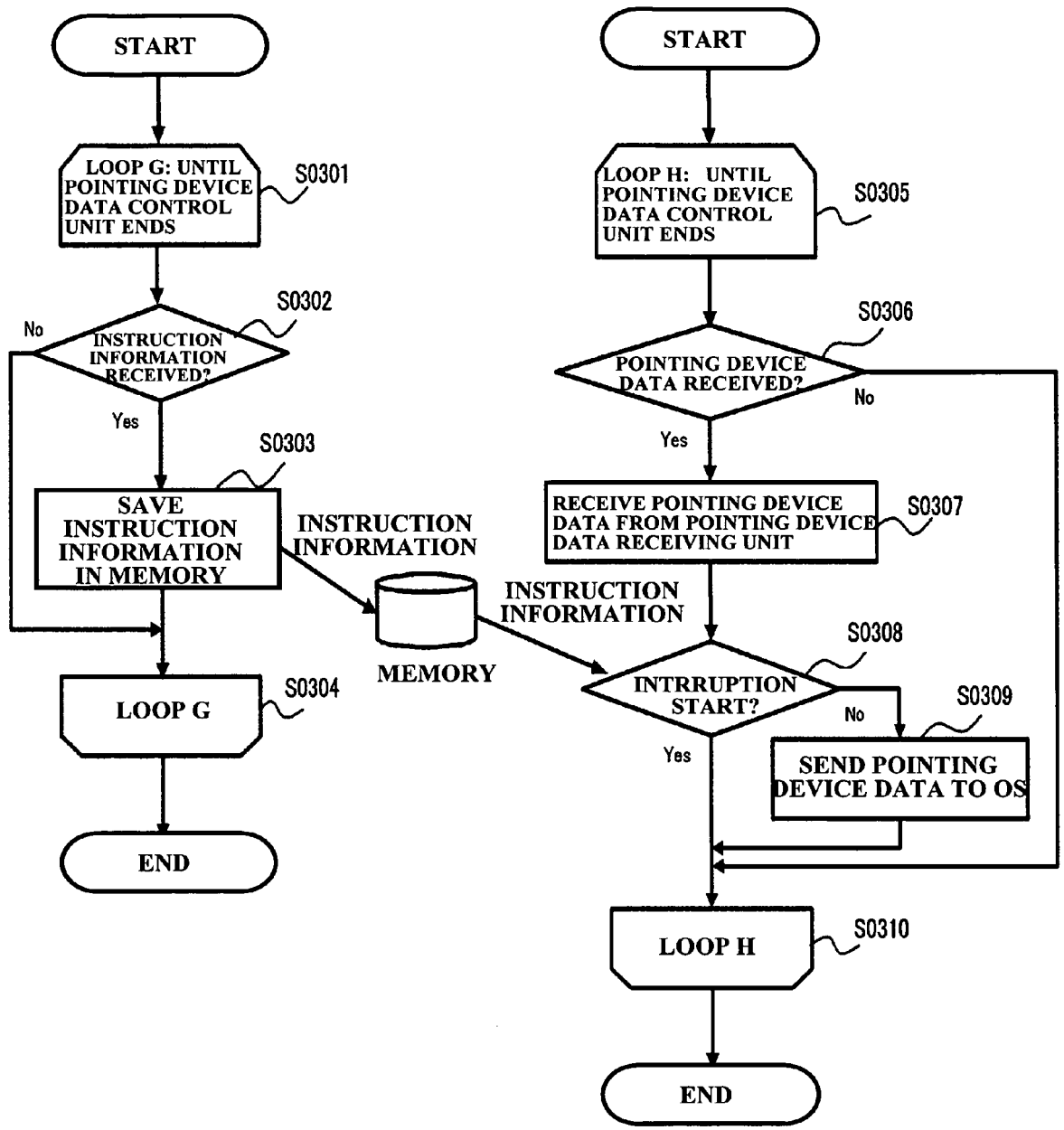
FIG. 7 is a flowchart describing a process flow of a pointing device data control unit 65.

FIG. 7 is a flowchart describing a process flow of the pointing device data control unit 65. The process flow of the pointing device data control unit 65 is composed of steps S0301 through S0304 and steps S0305 through S0310. The steps S0301 through S0304 describe the process flow of the instruction information outputted from the interface control unit 66, and steps S0305 through S0310 describe the process flow of the pointing device data sent from the pointing device data receiving unit 62. The steps S0301 through S0304 and the steps S0305 through S0310 operate independently. First, a description will be given of the process flow of the instruction information from the interface control unit 66. In step S0302, the pointing device data control unit 65 stands by until the instruction information is sent from the interface control unit 66. In step S0303, the instruction information received from the interface control unit 66 is stored in the memory 63.

A description will now be given of the process flow of the pointing device data sent from the pointing device data receiving unit 62. In step S0306, the pointing device data receiving unit 62 stands by until the pointing device data is received from the pointing device data receiving unit 62. In step S0307, the pointing device data is received from the pointing device data control unit 65. In step S0308, the instruction information is read out from the memory 63, and it is checked whether the read-out information is a request to start interrupting pointing device data or a request to end interrupting pointing device data.

The request to start interrupting pointing device data and the request to end interrupting pointing device data are mutually exclusive. In step S0308, if it is the request to start interrupting pointing device data, the pointing device data transmission to the OS 70 is interrupted, the pointing device data having been received from the pointing device data receiving unit 62. If it is the request to end interrupting pointing device data, the pointing device data received from the pointing device data receiving unit 62 is transmitted to the OS 70 in step S0309.

Next, a description will now be given of the server communication unit 67. The server communication unit 67 has following capabilities including the capability of transmitting the key code or the pointing device data stored in the memory 63 to the servers 4 through 9.

Hereinafter the pointing device 11, the pointing device data, and the pointing device data receiving unit 62 will be enclosed within parentheses, since the function of the pointing device corresponds to the keyboard 10, the function of the pointing device data corresponds to the key code, and the function of the pointing device data receiving unit 62 corresponds to the key code receiving unit 61.

The server communication unit 67 has the following capabilities. The server communication unit 67 reads out the key code (the pointing device data) that has been stored in the memory 63 by the key code receiving unit 61 (the pointing device data receiving unit 62), confirms that the key code (the pointing device data) stored in the memory 63 has been updated by the key code receiving unit 61 (the pointing device data receiving unit 62), designates information to be sent, also designates a destination address of another communication device on the network 13 to which the information is sent, reads out the destination address from the memory 63, receives the instruction information transmitted from the interface control unit 66, stores the instruction information transmitted from the interface control unit 66 in the memory 63, reads out the instruction information stored in the memory 63, and switches on and off to send the key code (the pointing device data) in the memory 63 to another communication device, according to the instruction information from the interface control unit 66.

Figure 8:
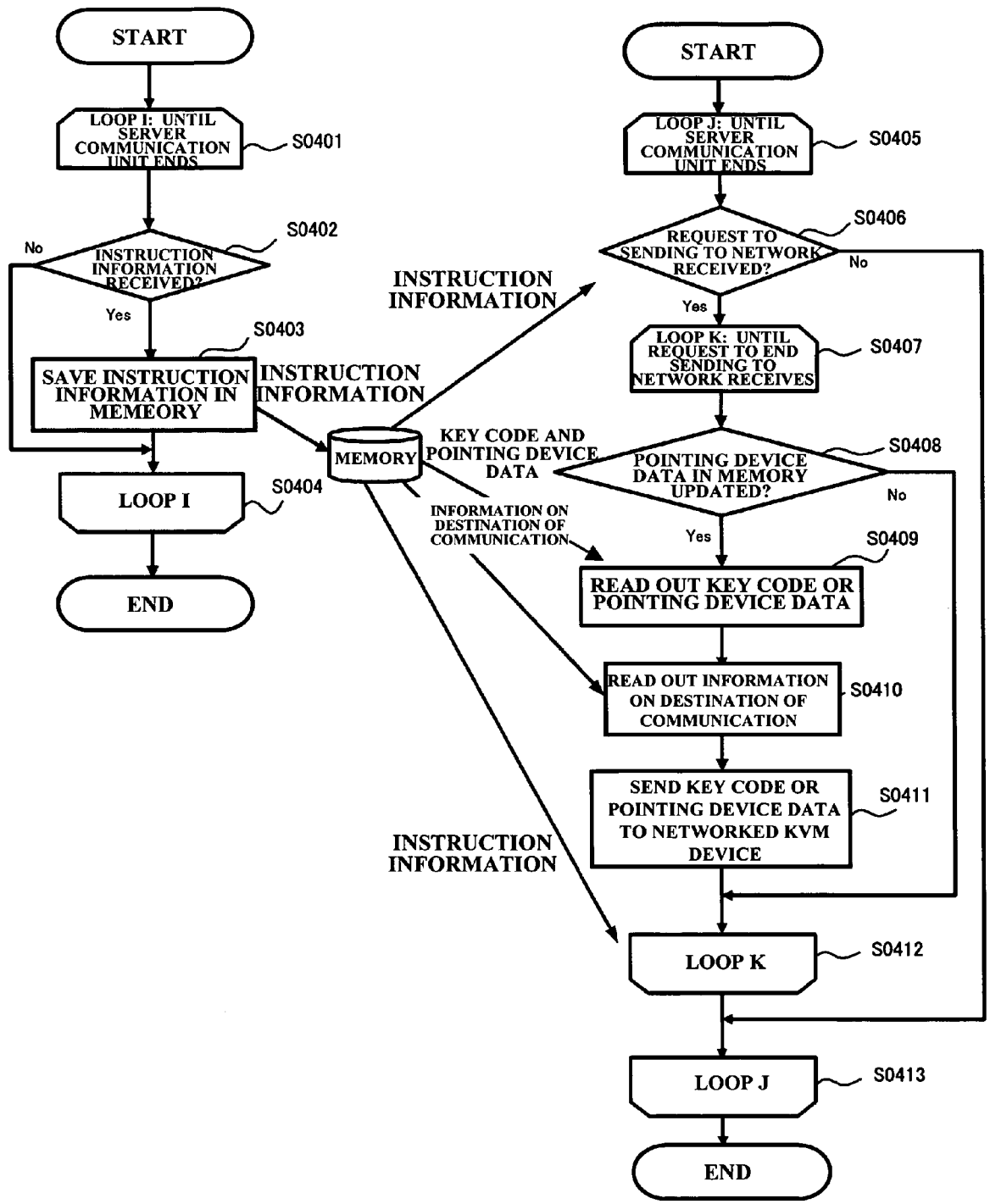
FIG. 8 is a flowchart describing a process flow of a server communication unit 67.

FIG. 8 is a flowchart describing a process flow of the server communication unit 67. The process flow of the server communication unit 67 is composed of steps S0401 through S0404 and steps S0405 through S0410. The steps S0401 through S0404 describe the process flow of the instruction information from the interface control unit 66, and steps S0405 through S0410 describe the process flow of reading out the key code (the pointing device data) that has been stored in the memory 63 by the key code receiving unit 61 (the pointing device data receiving unit 62). The steps S0401 through S0404 and the steps S0405 through S0410 operate independently. First, a description will be given of the process flow of the instruction information from the interface control unit 66. In step S0402, the server communication unit 67 stands by until the instruction information is sent from the interface control unit 66. In step S0403, the instruction information received from the interface control unit 66 is stored in the memory 63.

A description will now be given of the process flow of the key code (the pointing device data) stored in the memory 63 by the key code receiving unit 61 (the pointing device data receiving unit 62). In step S0406, the server communication unit 67 reads out the instruction information from the memory 63, and confirms a request to start sending to network and a request to end sending to network, according to the read-out information. The request to start sending to network and the request to end sending to network are mutually exclusive. In step S0408, if it is the request to start sending to network, the server communication unit 67 starts sending the key code (the pointing device data) stored in the memory 63 by the key code receiving unit 61 (the pointing device data receiving unit 62). If it is the request to end sending to network, a transmission does not start until the request to start sending to network is stored in the memory 63.

In step S0408, if it is the request to start sending to network, the server communication unit 67 checks whether the key code (the pointing device data) stored by the key code receiving unit 61 (the pointing device data receiving unit 62) has been updated. If it has been updated, the server communication unit 67 reads out the updated key code (the updated pointing device data) from the memory 63 in step S0409, and also reads out information on a destination of communication in step S0410 from the memory 63. The information on the destination of communication is necessary for remotely operating the servers 4 through 9 that are connected to the networked KVM devices 2 or 3 on the network 13, to which the communication device 13 is also connected.

In step S0411, the server communication unit 67 sends the key code (the pointing device data) that has been read out from the memory 63 to the networked KVM device 2 or 3, which is included in the information on the destination of communication. If it has not been updated in step S0408, the server communication unit 67 does not carry out a transmission until the key code (the pointing device data) that is stored in the memory 63 is updated.

In loop S0407, the server communication unit 67 stands by for the update of the key code (the pointing device data) stored in the memory 63 by the key code receiving unit 61 (the pointing device data receiving unit 62), until the instruction information is read out from the memory 63 and the request to end sending to network is stored. In step S0408, if the key code (the pointing device data) stored in the memory 63 by the key code receiving unit 61 (the pointing device data receiving unit 62) has not been updated, the server communication unit 67 stands by for the update of the key code (the pointing device data) stored in the memory 63 by the key code receiving unit 61 (the pointing device data receiving unit 62), until the instruction information is read out from the memory 63 and the request to end sending to network is stored.

Next, a description will now be given of the interface control unit 66. The interface control unit 66 transmits the key code (the pointing device data) that is stored in the memory 63, to the application 80. The application 80 runs on the OS 70 for operation by remote control.

The interface control unit 66 has following capabilities. The interface control unit 66 reads out the key code (the pointing device data) that is stored in the memory 63 by the key code receiving unit 61 (the pointing device data receiving unit 62), transmits the key code (the pointing device data) to the application 80, confirms that the above-mentioned stored key code has been updated by the key code receiving unit 61 (the pointing device data receiving unit 62), receives the instruction information that has been transmitted from the application 80, stores the instruction information that has been received from the application 80 in the memory 63, reads out the instruction information that is stored in the memory 63, transmits the above-mentioned received instruction information to the key code receiving unit 61 (the pointing device data receiving unit 62), transmits the above-mentioned received instruction information to the key code control unit 64 (the pointing device data control unit 65), transmits the above-mentioned received instruction information to the server communication unit 67, and switches on and off to transmit the key code (the pointing device data) that has been read out from the memory 63, according to the instruction information from the application 80.

Figure 9:
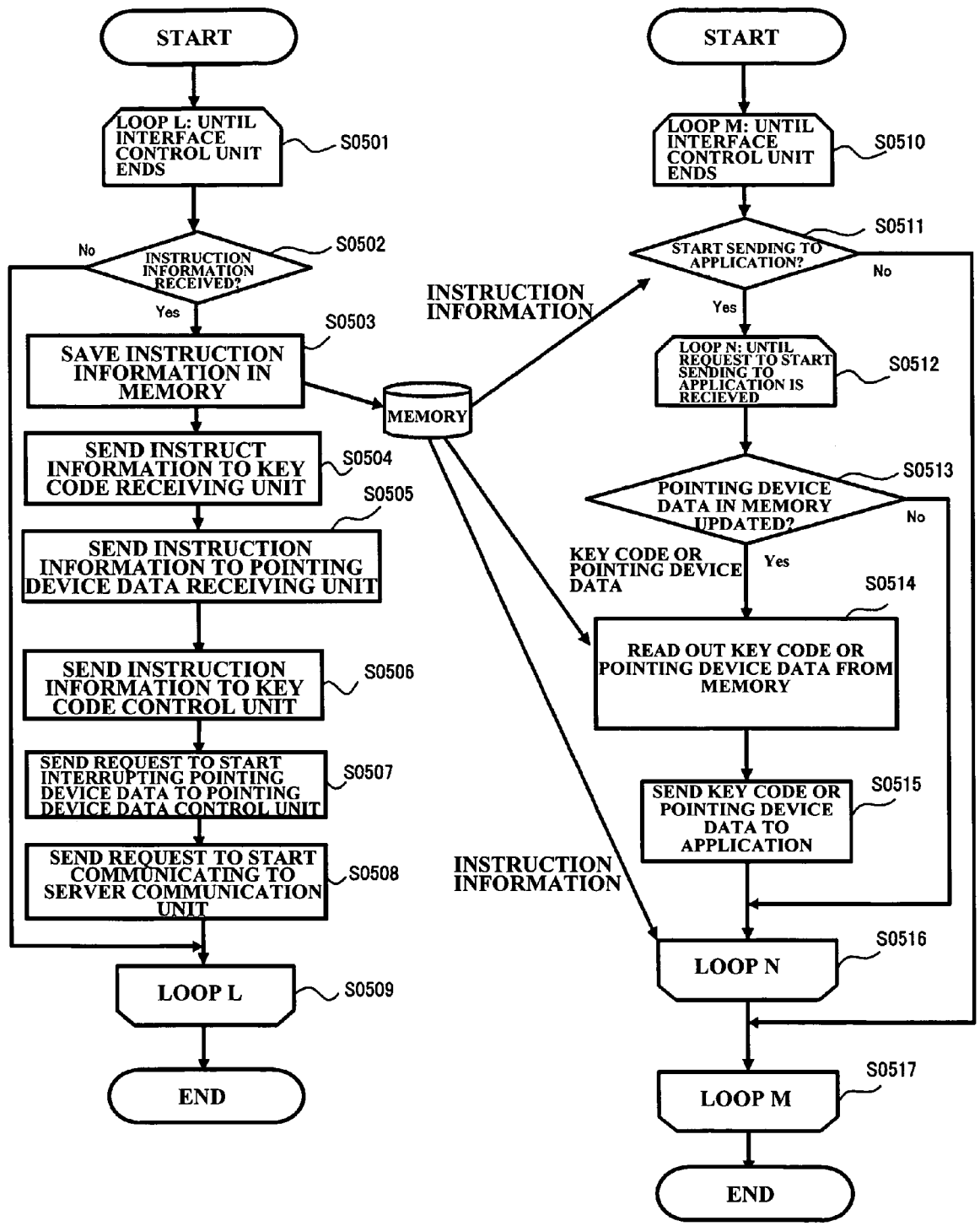
FIG. 9 is a flowchart describing a process flow of an interface control unit 66.

FIG. 9 is a flowchart describing a process flow of the interface control unit 66. The process flow of interface control unit 66 is composed of steps S0501 through S0509 and steps S0510 through S0517. The steps S0501 through S0509 describe the process flow of the instruction information from the application 80, and steps S0510 through S0517 describe the process flow of reading out the key code (the pointing device data) that has been stored in the memory 63 by the key code receiving unit 61 (the pointing device data receiving unit 62). The steps S0501 through S0509 and the steps S0510 through S0517 operate independently.

First, a description will be given of the process flow of the instruction information from the application 80. In step S0502, the interface control unit 66 stands by until the instruction information is sent from the application 80. In step S0503, the interface control unit 66 stores the instruction information that has been received from the application 80 in the memory 63. In step S0504, the interface control unit 66 sends the instruction information to the key code receiving unit 61. In step S0505, the interface control unit 66 sends the instruction information to the pointing device data receiving unit 62.

In step S0506, the interface control unit 66 transmits the instruction information to the key code control unit 64. In step S0507, the interface control unit 66 transmits a request to start interrupting to the pointing device control unit 65. In step S0508, the interface control unit 66 transmits a request to start communicating to the server communication unit 67.

Next, a description will now be given of the read-out processes of the key code (the pointing device data) that has been stored in the memory 63 by the key code receiving unit 61 (the pointing device data receiving unit 62). In step S0511, the interface control unit 66 reads out the instruction information from the memory 63, and confirms a request to start sending to application or a request to end sending to application, according to the read-out information. The request to start sending to application and the request to end sending to application are mutually exclusive. In step S0513, if it is the request to start sending to application, the interface control unit 66 starts sending the key code (the pointing device data) that has been stored in the memory 63 by the key code receiving unit 61 (the pointing device data receiving unit 62).

If it is the request to end sending to application, the interface control unit 66 does not start a transmission until the request to start sending to application is stored in the memory 63. In step S0513, the interface control unit 66 checks whether the key code (the pointing device data) has been updated by the key code receiving unit 61 (the pointing device data receiving unit 62). If it has been updated, the interface control unit 66 reads out the updated key code (the updated pointing device data) from the memory 63 in step S0514. Then, in step S0515, the interface control unit 66 sends the key code (the pointing device data) to the application 80.

In step S0513, if the key code (the pointing device data) stored by the key code receiving unit 61 (the pointing device data receiving unit 62) in the memory 63 has not been updated, the interface control unit 66 does not carry out a transmission until the key code (the pointing device data) that has been stored in the memory 63 is updated. In loop S0516, the interface control unit 66 reads out the instruction information from the memory 63, and stands by for the update of the key code (the pointing device data) stored in the memory 63 performed by the key code receiving unit 61 (the pointing device data receiving unit 62), until the instruction information is read out from the memory 63 and the request to end sending to application is stored.

Next, a description will now be given of a system operation. The application 80 transmits a request to operate server to the interface control unit 66, before the keyboard 10 (the pointing device 11) is operated. The interface control unit 66 that has received the request to operate server transmits an interruption request to the keyboard receiving unit 61, a save request to save in the pointing device data receiving unit 62, the request to the keyboard control unit 64, the interruption request to the pointing device data control unit 65, and a communication request to the server communication unit 67.

After these processes are performed, when inputted on the keyboard 10, a key code is generated. The key code receiving unit 61 receives the key code, transmits the key code to the key code control unit 64, and saves the key code in the memory 63, according to the save request. The key code control unit 64, according to the above-mentioned interruption request, interrupts any key code transmission to the OS 70.

The server communication unit 67 reads out the key code from the memory 63, and sends to the communication device 12. The key code is transmitted to the networked KVM devices 2 or 3 from the communication device 12 through the network 13. The interface control unit 66 reads out the key code from the memory 63, sends to the application 80 so that the interface 66 can make a request to start remote operation or a request to end remote operation, according to the key code received by the application 80.

Regarding the pointing device 11, when inputted on the pointing device 11, the pointing device data is generated. The pointing device data receiving unit 62 receives the pointing device data, sends the pointing device data to the pointing device data control unit 65, and save the pointing device data in the memory 63, according to the save request. The pointing device data control unit 65, according to the interruption request, interrupts any pointing device data transmission to the OS 70.

The server communication unit 67 reads out the pointing device data from the memory 63, and sends to the communication device 12. The pointing device data is transmitted to the networked KVM devices 2 or 3 from the communication device 12 through the network 13. The interface control unit 66 reads out the pointing device data from the memory 63, and sends to the application 80 so that the interface 66 can make a request to start remote operation or request to end remote operation, according to the pointing device data received by the application 80.

Thus, the inputted key code and the pointing device data can be transmitted to the networked KVM devices 2 or 3 instead of being transmitted to the OS 70. This transmission is not affected by another application that is monitoring a key code or a device data input, and a special key can be sent to the networked KVM devices 2 or 3. Therefore, an ordinary key operation can be performed even in the remote operation via the network. The inputted key code or the pointing device data can be transmitted to the application for remote operation so that the start and end of the remote operation of the server can be realized, according to the key code or the pointing device data received by the application.

Figure 10:
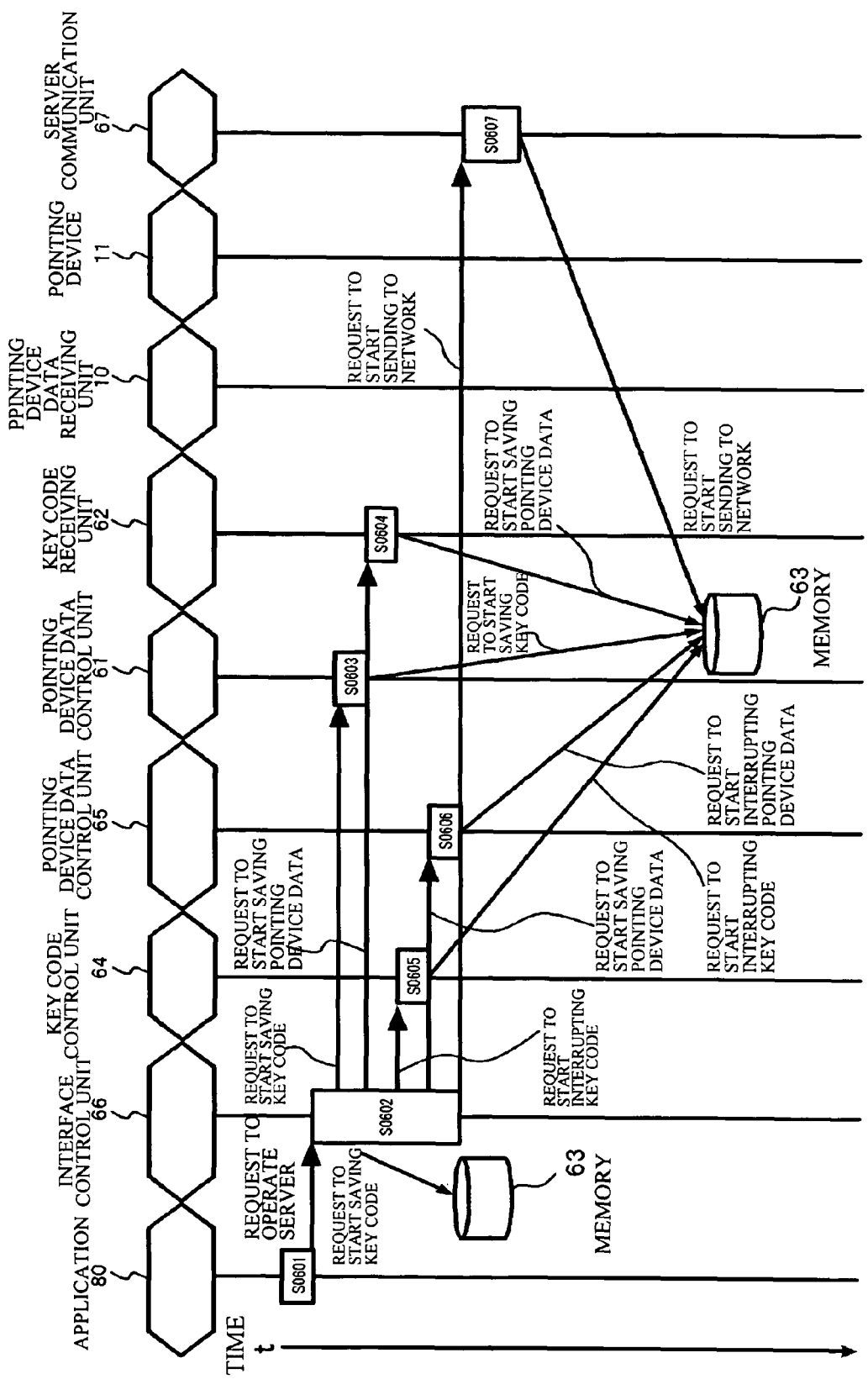
FIG. 10 illustrates a sequence of a process flow in FIG. 3.
Figure 11:
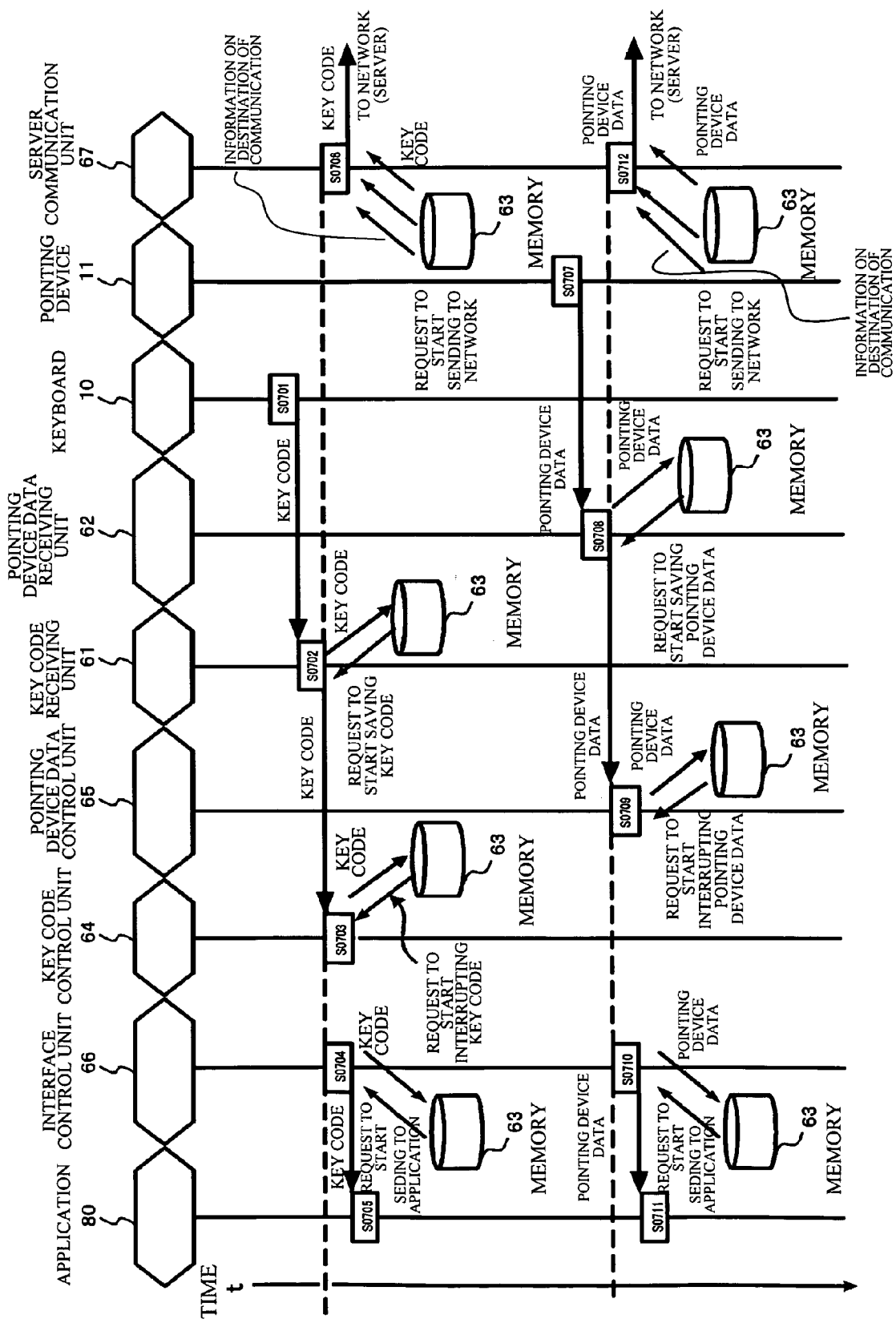
FIG. 11 illustrates another sequence of the process flow in FIG. 3.
Figure 12:
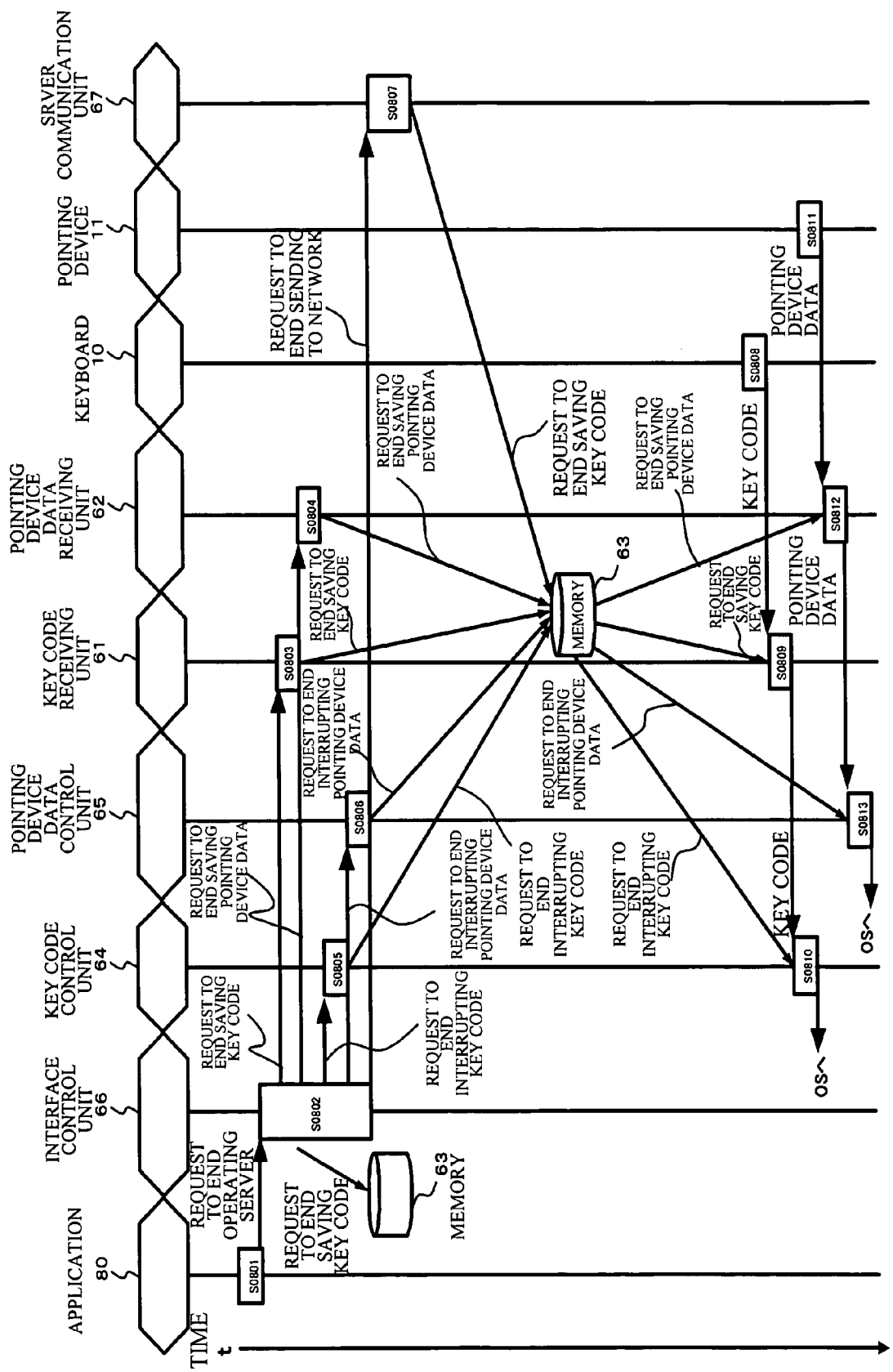
FIG. 12 illustrates another sequence of the process flow in FIG. 3.

A description will now be given of the module processes in accordance with the first embodiment of the present invention. Referring to FIGS. 10 through 12, process sequences of FIG. 3 are shown. A request to start operating server is instruction information including the request to start saving key code, the request to start saving pointing device data, the request to start interrupting key code, the request to start interrupting pointing device data, the request to start sending to network, and the request to start sending to application. A request to end operating server is instruction information including the request to end saving key code, the request to end saving pointing device data, the request to end interrupting key code, the request to end interrupting pointing device data, the request to end sending to network, and the request to end sending to application.

Referring to FIG. 10, in step S0601, a user sends the request to start operating server from the application 80. In step S0602, the interface control unit 66 receives the request to start operating server in step S0502 in FIG. 9, and saves the request to start operating server in the memory 63 in step S0503. The request to start operating server includes the request to start sending to application. Therefore, the key code (the pointing device data), which has been read out from the memory 63, is set to be sent to the application 81.

In steps S0504 through S0508, the interface control unit 66, according to the request to start operating server, respectively sends the request to start saving key code to the key code receiving unit 61, the request to start saving pointing device data to the pointing device data receiving unit 62, the request to start interrupting key code to the key code control unit 64, the request to start interrupting pointing device data to the pointing device data control unit 65, and the request to start sending to network to the server communication unit 67.

In step S0603, the key code receiving unit 61 receives the request to start saving key code, as shown in step S0002 in FIG. 4. The key code, which has been received from the keyboard 10, is set to be saved in the memory 63. In step S0604, the pointing device data receiving unit 62 receives the request to start saving pointing device data, as shown in step S0102 in FIG. 5. In step S0103, the request to start saving pointing device data is saved in the memory 63. Thus, the pointing device data, which has been received from the pointing device data receiving unit 62, is set to be saved in the memory 63.

In step S0605, the key code control unit 64 receives the request to start interrupting key code, as shown in step S0202 in FIG. 6. In step S0203, the request to start interrupting key code is saved in the memory 63. Thus, the transmission of the key code to the OS 70 is set to be interrupted, the key code having been received from the key code receiving unit 61. In step S0606, the pointing device data control unit 65 receives the request to start interrupting pointing device data, as shown in step S0302 in FIG. 7. In step S0303, the request to start interrupting pointing device data is saved in the memory 63. Thus, the transmission of the pointing device data to the OS 70 is set to be interrupted, the pointing device data having been received from the pointing device data receiving unit 62.

In step S0607, the server communication unit 67 receives the request to start sending to network as shown in step S0402 in FIG. 8. In step S0403, the request to start sending to network is saved in the memory 63. Thus, the key code or the pointing device data, which has been read out from the memory 63, is set to be sent to the networked KVM devices 2 or 3.

Then, the key code is sent to in order of the keyboard 10, the key code receiving unit 61, the key code control unit 64, the memory 63, the server communication unit 67, the communication device 12, the networked KVM devices 2 or 3, and the server to be operated. As another transmission path, the key code is sent to in order of the keyboard 10, the key code receiving unit 61, the key code control unit 64, the memory 63, the interface control unit 66, and the application 80. It is thus capable of remotely operating the servers 4 through 9 without sending the key code to the OS 70.

Regarding data of the pointing device 11, there are two paths as described above. That is, the pointing device data is sent to in order of the pointing device 11, the pointing device data receiving unit 62, the pointing device control unit 65, the memory 63, the server communication unit 67, the communication device 12, the networked KVM devices 2 or 3, and the server to be operated. As another transmission path, the pointing device data is sent to in order of the pointing device 11, the pointing device data receiving unit 61, the pointing device data control unit 65, the memory 63, the interface control unit 66, and the application 80. It is thus capable of remotely operating the servers 4 through 9 without sending the pointing device data to the OS 70.

Further, referring to FIG. 11, a description will be given of the process flow for remote operation in the above-mentioned situation. First, regarding the key code transmission, in step S0701, the key code is generated by the keyboard operation. The key code receiving unit 61 receives the key code in step S0006 in FIG. 4. In step S0702, the key code receiving unit 61 sends the key code to the key code control unit 64 in step S0007 in FIG. 4. The key code is in a save state due to the request to start saving key code, and the key code is saved in the memory 63 in step S0009.

In step S0703, the key code control unit 64 receives the key code from the key code receiving unit 61 as shown in step S0206 in FIG. 6. However, the key code is in a transmission interruption state due to the request to start interrupting key code, the key code transmission to the OS 70 is interrupted. In step S0704, the interface control unit 66 reads out from the memory 63, the key code that has been stored in the memory by the key code receiving unit 61 as shown in S0514 in FIG. 9. The key code is in a transmission state due to the request to start sending to application, the key code is sent to the application 80 in step S0515.

In step S0705, the application 80 receives the key code. In step S0706, the server communication unit 67 reads out from the memory 63, the key code that has been saved by the key code receiving unit 61. The key codes is in a transmission state due to the request to start sending to network, the key code is sent to the communication device 12 in step S0411.

Next, a description will now be given of the data transmission of the pointing device data. In step S0707, the pointing device data is generated by operating the pointing device 11. The pointing device data receiving unit 62 receives the pointing device data in step S0106 in FIG. 5. In step S0708, the pointing device data receiving unit 62 sends the pointing device data to the pointing device data control unit 65 in step S0107 in FIG. 5. Due to the request to start saving pointing device data, the pointing device data is saved in the memory 63 in step S0109.

In step S0709, the pointing device data control unit 65 receives the pointing device data from the pointing device data receiving unit 62 as shown in step S0306 in FIG. 7. However, the pointing device data is in a transmission interruption state due to the request to start interrupting pointing device data, and the pointing device data transmission to the OS 70 is interrupted.

In step S0710, the interface control unit 66 reads out from the memory 63, the pointing device data that has been stored in the memory by the pointing device data receiving unit 62 as shown in S0514 in FIG. 9. The pointing device data is in a transmission state due to the request to start sending to application, and the pointing device data is sent to the application 80 in step S0711.

In step S0712, the server communication unit 67 reads out from the memory 63, the pointing device data that has been stored in the memory 63 by the pointing device data receiving unit 62, as shown in step S0409 in FIG. 8. The pointing device data is in a transmission state due to the request to start sending to network, and the pointing device data is sent to the communication device 12 in step S0411. As mentioned above, it is possible to operate the servers 4 through 9 by remote control without sending the key code or the pointing device data to the OS 70.

Referring to FIG. 12, a description will now be given of the process flow of how the key code or the pointing device data loading onto the OS 70 of the console PC 51, when completing the remote operation on the server. In step S0801, when a user completes the remote operation on the server with the key code or the pointing device data that has been obtained in order to transmit the key code or the pointing device data, the application 80 sends a request to end operating server to the interface control unit 66.

In step S0802, the interface control unit 66 receives the request to end operating server as shown in step S0502 in FIG. 9. In step S0503, the request to end operating server is saved in the memory 63. The request to end operating server includes the request to end sending to application. Therefore, the interface control unit 66 is set to end sending to the application 80. In addition, in steps S0504 through S0508, due to the request to end operating server, the interface control unit 66 respectively sends the request to end saving key code to the key code receiving unit 61, the request to end saving pointing device data to the pointing device data receiving unit 62, the request to end interrupting key code to the key code control unit 64, the request to end interrupting pointing device data to the pointing device data control unit 65, and the request to end sending to network to the server communication unit 67.

In step S0803, the key code receiving unit 61 receives the request to end saving key code as shown in step S0002 in FIG. 4. In step S0003, the request to end saving key code is stored in the memory 63. Thus, it is set not to store in the memory 63, the key code received from the keyboard 10.

In step S0804, the pointing device data receiving unit 62 receives the request to end saving pointing device data as shown in step S0102 in FIG. 5. In step S0103, the request to end saving pointing device data is saved in the memory 63. Thus, the pointing device data receiving unit 62 is set not to save in the memory 63, the pointing device data that has been received from the pointing device 11. In step S0805, the key code control unit 64 receives the request to start interrupting key code as shown in step S0202 in FIG. 6. In step S0203, the request to end interrupting key code is saved in the memory 63. Thus, the key code control unit 64 is set to transmit to the OS 70, the key code that has been received from the key code receiving unit 61.

In step S0806, the pointing device data control unit 65 receives the request to end interrupting pointing device data as shown in step S0302 in FIG. 7. The request to end interrupting pointing device data is saved in the memory 63 in step S0303. The pointing device data control unit 65 is set to send to the OS 70, the pointing device data that has been received from the pointing device data receiving unit 62.

In step S0807, the server communication unit 67 receives the request to end sending to network as shown in step S0402 in FIG. 8. In step S0403, by saving the request to end sending to network in the memory 63, the key code or the pointing device data is stopped reading out from the memory 63. The transmission to the communication device 12 is also stopped. Then, the transmission is set to be ended. Thus, the transmission of the key code or the pointing device data to the networked KVM devices 2 or 3 is stopped. Instead, the key code or the pointing device data is sent to the OS 70.

In step S0808, a key code is generated by operating the keyboard 10. The key code is sent to the key code receiving unit 61. In step S0809, the key code receiving unit 61 receives the key code as shown in step S0006 in FIG. 4. In step S0007, the key code is transmitted to the key code control unit 64. In step S0810, the key code control unit 64 receives the key code transmitted from the key code receiving unit 61 as shown in step S0207 in FIG. 6, and sends the key code to the OS 70 in step S0209.

In step S0811, a pointing device data is generated by operating the pointing device 11. The pointing device data is sent to the pointing device data receiving unit 62. In step S0812, the pointing device data receiving unit 62 receives the pointing device data as shown in step S0106 in FIG. 5. In step S0107, the pointing device data is transmitted to the pointing device data control unit 65. In step S0813, the pointing device data control unit 65 receives the pointing device data that has been transmitted from the pointing device data receiving unit 62 as shown in step S0307 in FIG. 7, and sends the key code to the OS 70 in step S0309.

In accordance with the first embodiment of the present invention, it is possible to send the key code outputted from the keyboard 10 and the pointing device data outputted from the pointing device 11 to the KVM devices 2 or 3 without sending to the OS 70. The KVM devices 2 and 3 reside on the network 13. In addition, it is possible to directly send the key code outputted from the keyboard 10 and the pointing device data outputted from the pointing device 11 to the application 80 that runs on the OS 70, instead of sending to the OS 70. It is thus possible to send a special key to the servers 4 through 9 without being affected by another application that is monitoring any key input. Further, it is possible to realize an ordinary key operation by remote control over a network. A special key with the use of GUI is not sent, a continuous key input is allowed, and a GUI button needs not to be added.

Second Embodiment

Figure 13:
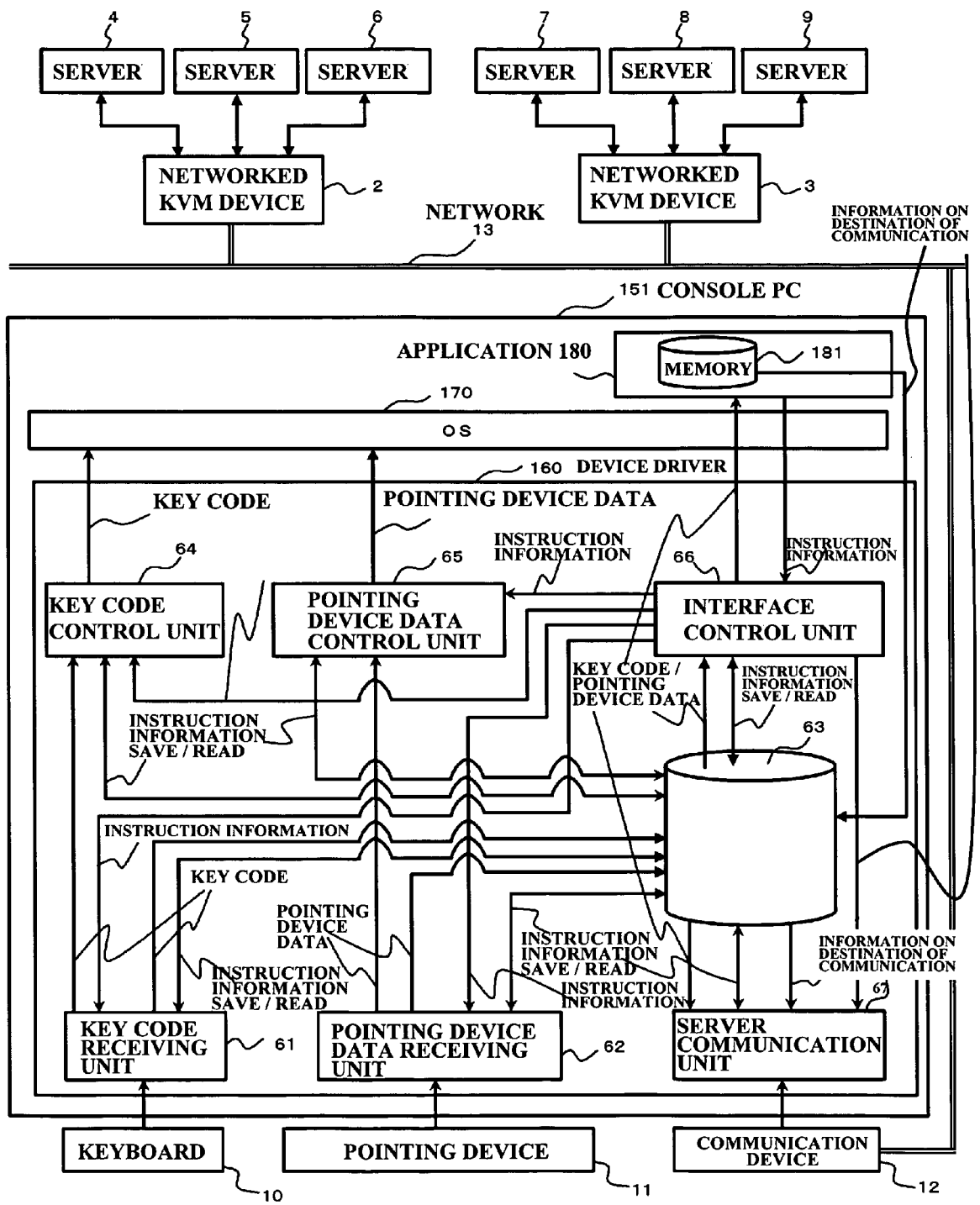
FIG. 13 is a block diagram of a system 200 in accordance with a second embodiment of the present invention.

A description will now be given of a second embodiment. In accordance with the second embodiment of the present invention, the present invention is applied to a computer system on which Windows® OS operates. FIG. 13 is a block diagram of a system 200 in accordance with the second embodiment of the present invention. Referring to FIG. 13, the system 200 includes a console PC 151, networked KVM devices 2 and 3, a servers 4 through 9, a keyboard 10, a pointing device 11, and a communication device 12.

The console PC 151 includes a device driver 160, an OS 170, and an application 180. The device driver 160 includes a key code receiving unit 61, a pointing device data receiving unit 62, a memory 63, a key code control unit 64, a pointing device data receiving unit 65, an interface 66, and a server communication unit 67. The application 180 includes a memory 181.

The console PC 151 is a Dos/V machine on which Windows® OS 170 operates. Images displayed on a server display are received by a module in the console PC 151 via the network. A precondition is that the application 180 can obtain information on the images.

Modules in accordance with the second embodiment of the present invention are the key code receiving unit 61, the pointing device data receiving unit 62, the key code control unit 64, the pointing device data control unit 65, the server communication unit 67, and the interface control unit 66, which are device drivers that operate in a kernel mode.

Figure 14:
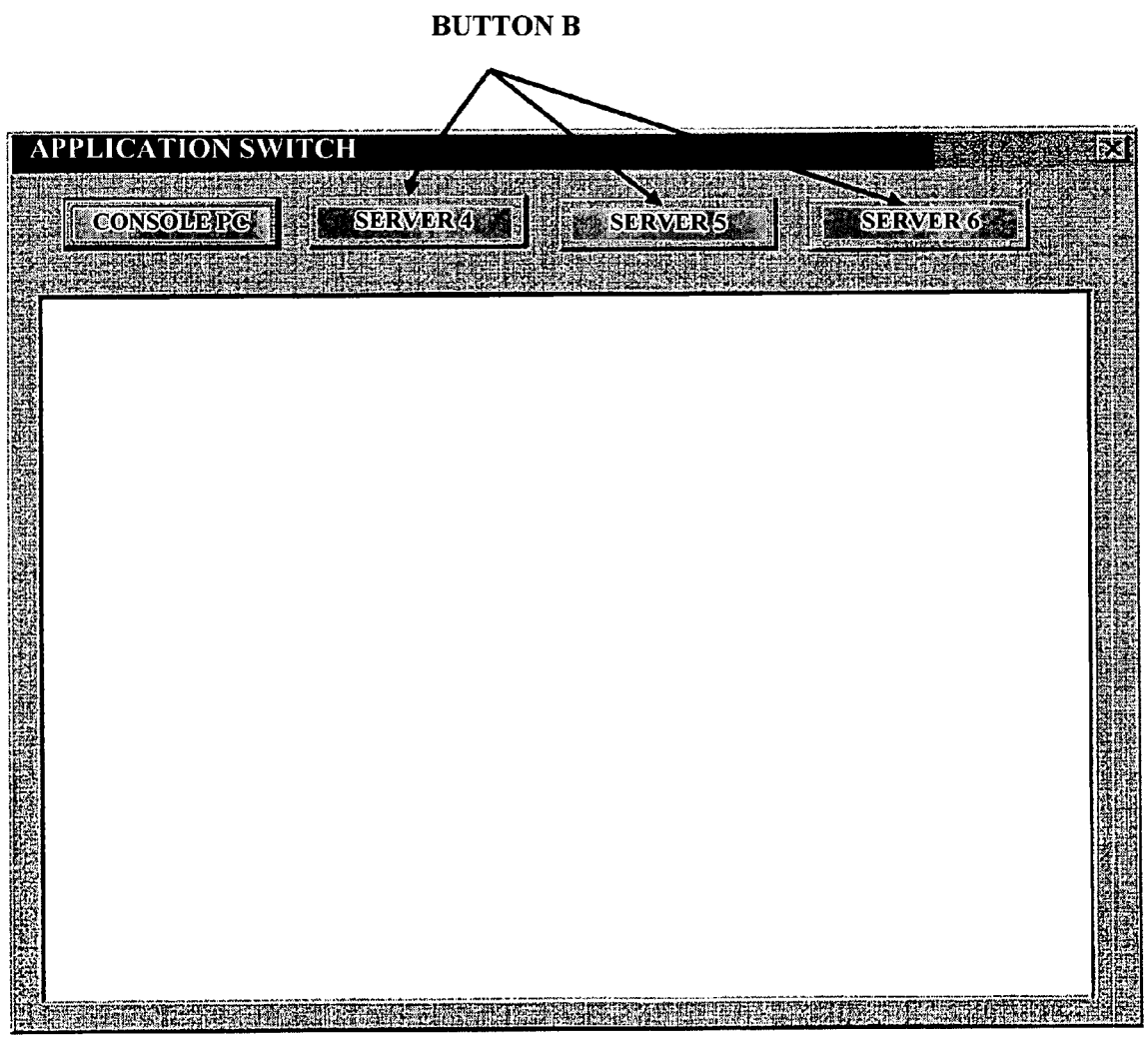
FIG. 14 illustrates a GUI of an application.

The application 180 is executed in a user mode and has a GUI as shown in FIG. 14. Information on the communication to the servers 4 through 9, which are connected from the application 180, is stored in the memory 181. The application 180 has the following capabilities. When one of buttons B having the server number is clicked, as shown in FIG. 14, the application 180 transmits the key code or the pointing device data to the clicked server, displays the clicked server desktop screen on a screen display unit, and moves a mouse cursor with the use of data from the pointing device 11 that is obtained from the interface receiving unit 66, when connected to the server.

Figure 16:
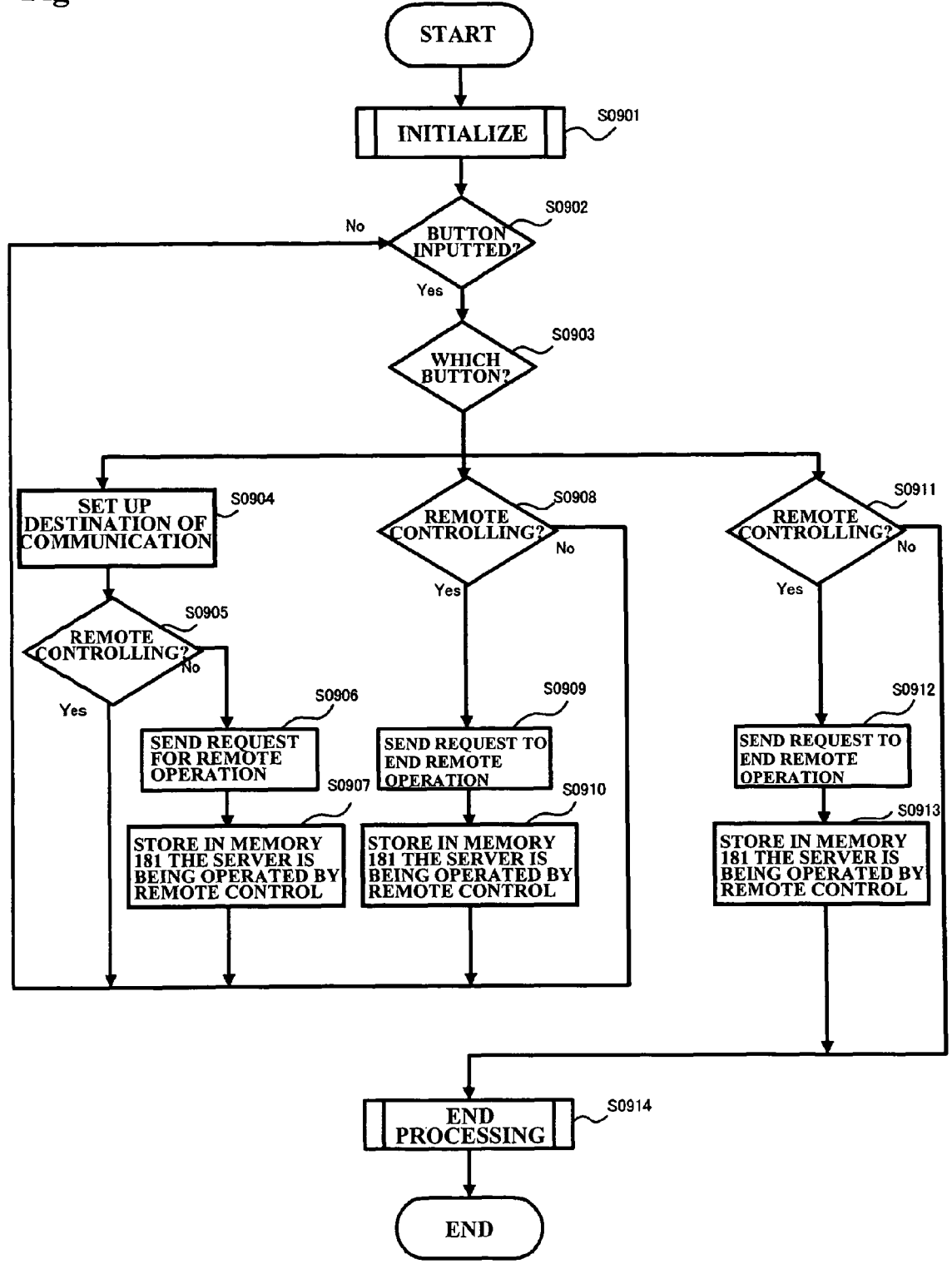
FIG. 16 is a flowchart describing a process flow of the application 180 in operating servers 4 through 9 at remote locations via the network 13.
Figure 17:
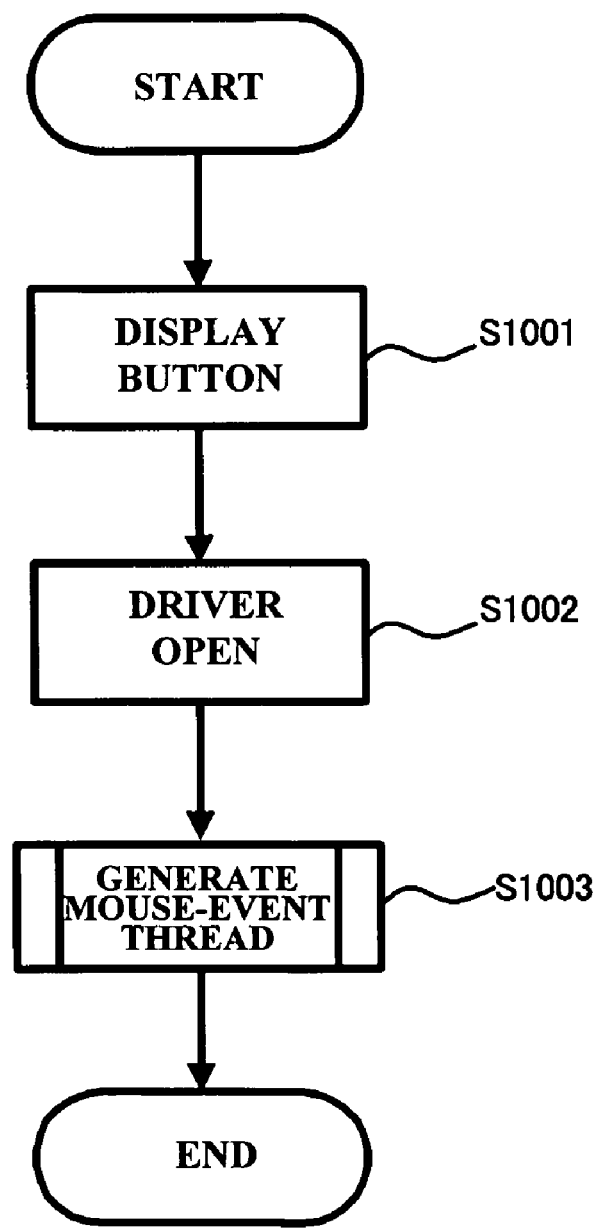
FIG. 17 is a flowchart describing a process flow for an initialization process.
Figure 18:
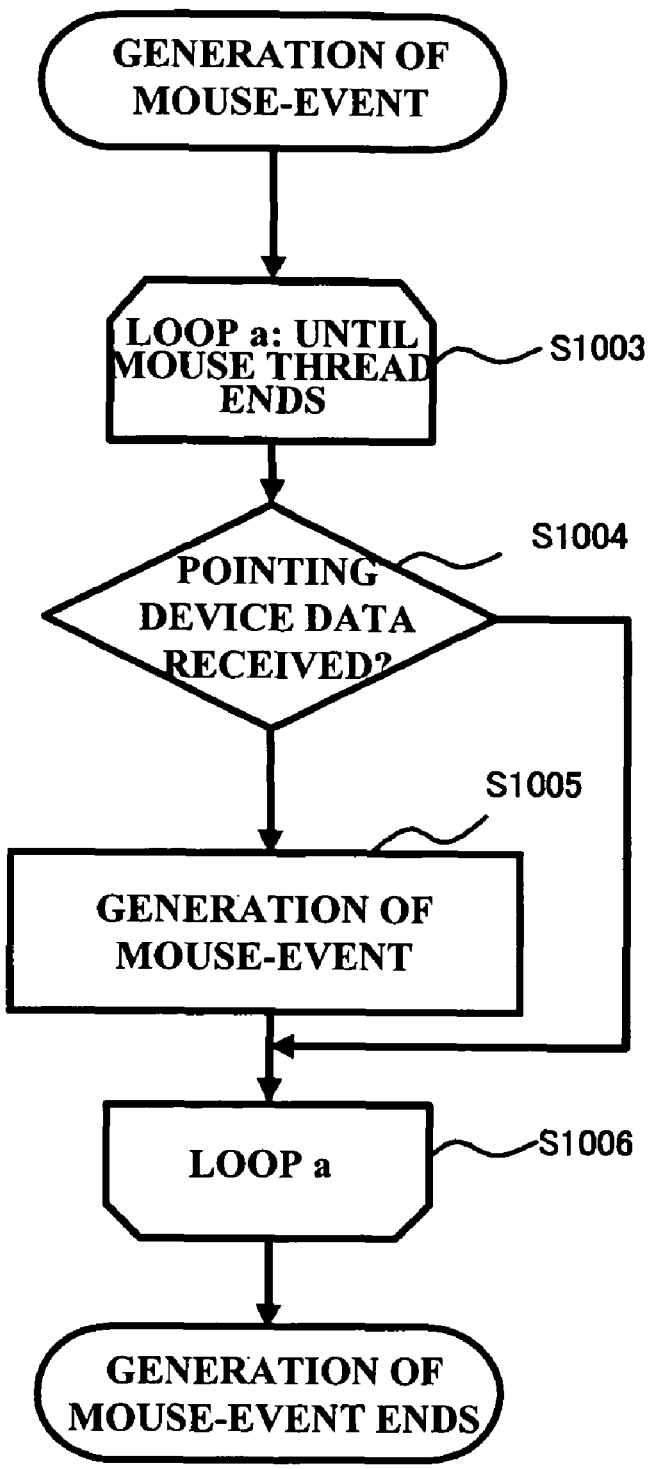
FIG. 18 is a flowchart describing a process flow for a mouse-event generation.
Figure 19:
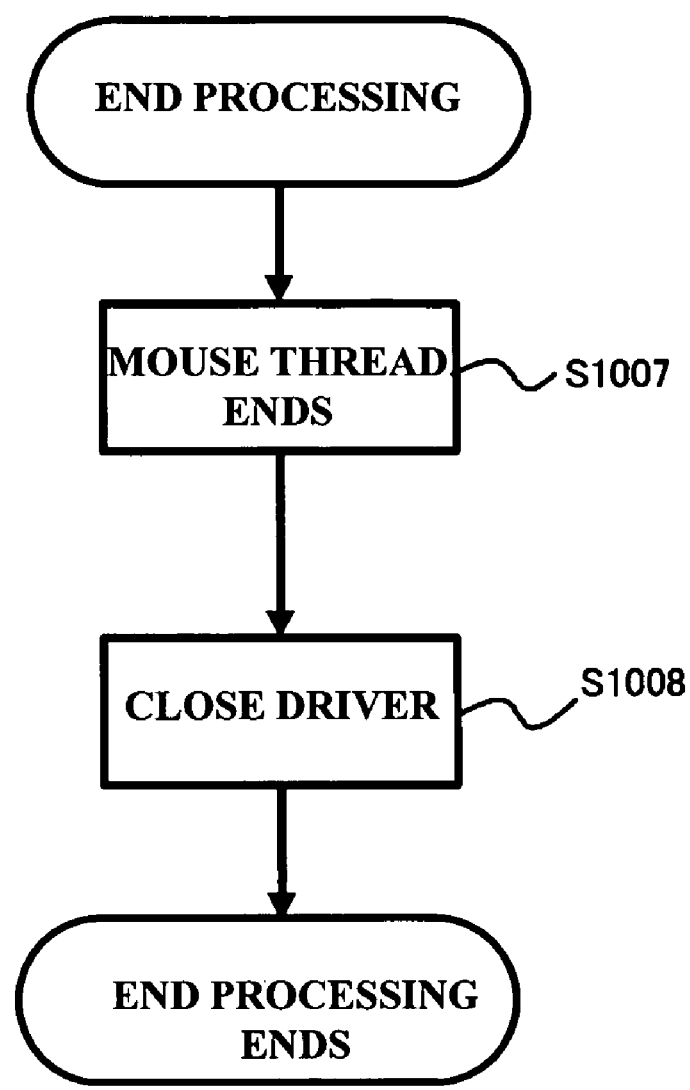
FIG. 19 is a flowchart describing a process flow for end process.
Figure 20:
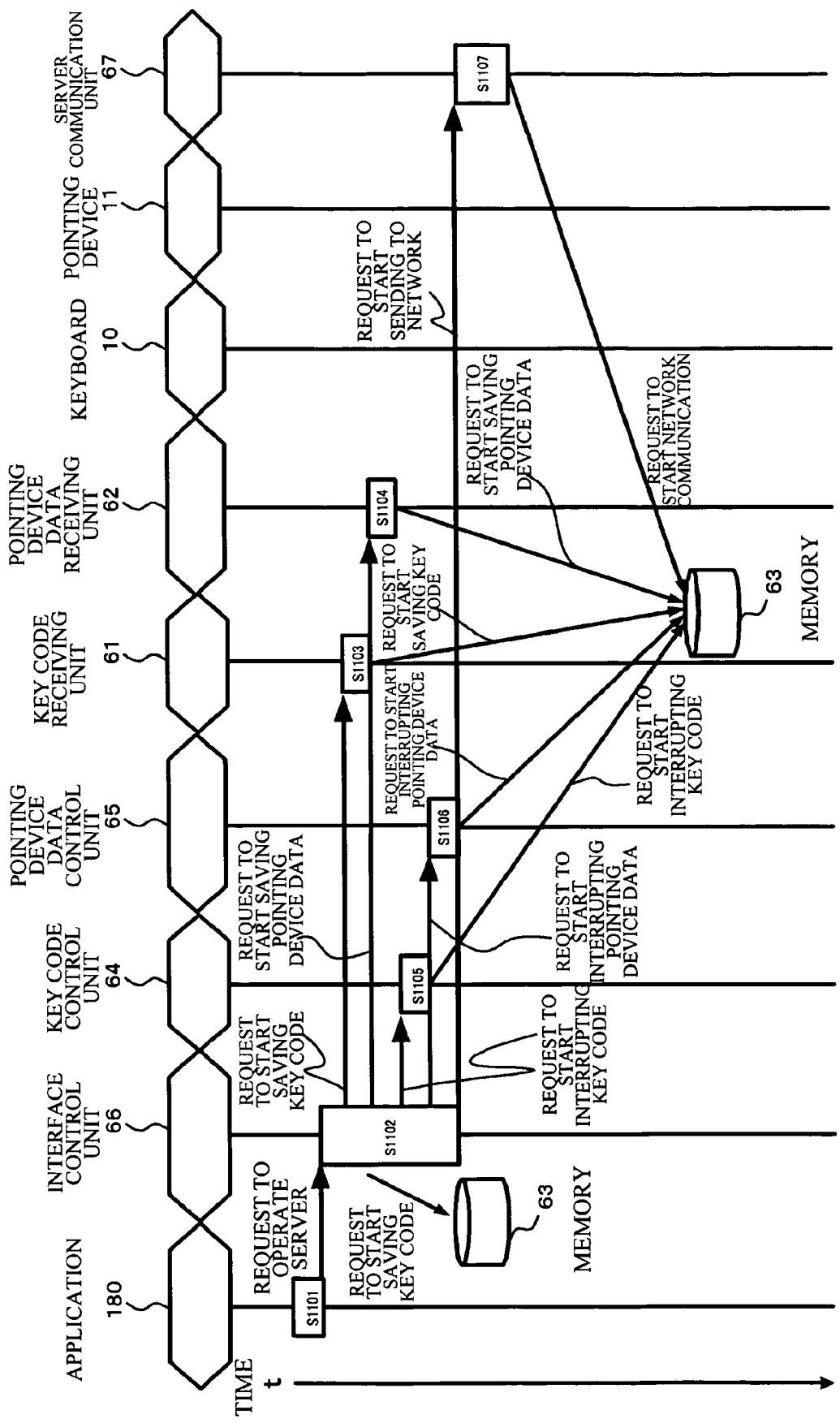
FIG. 20 illustrates a sequence of a process flow in FIG. 13.
Figure 21:
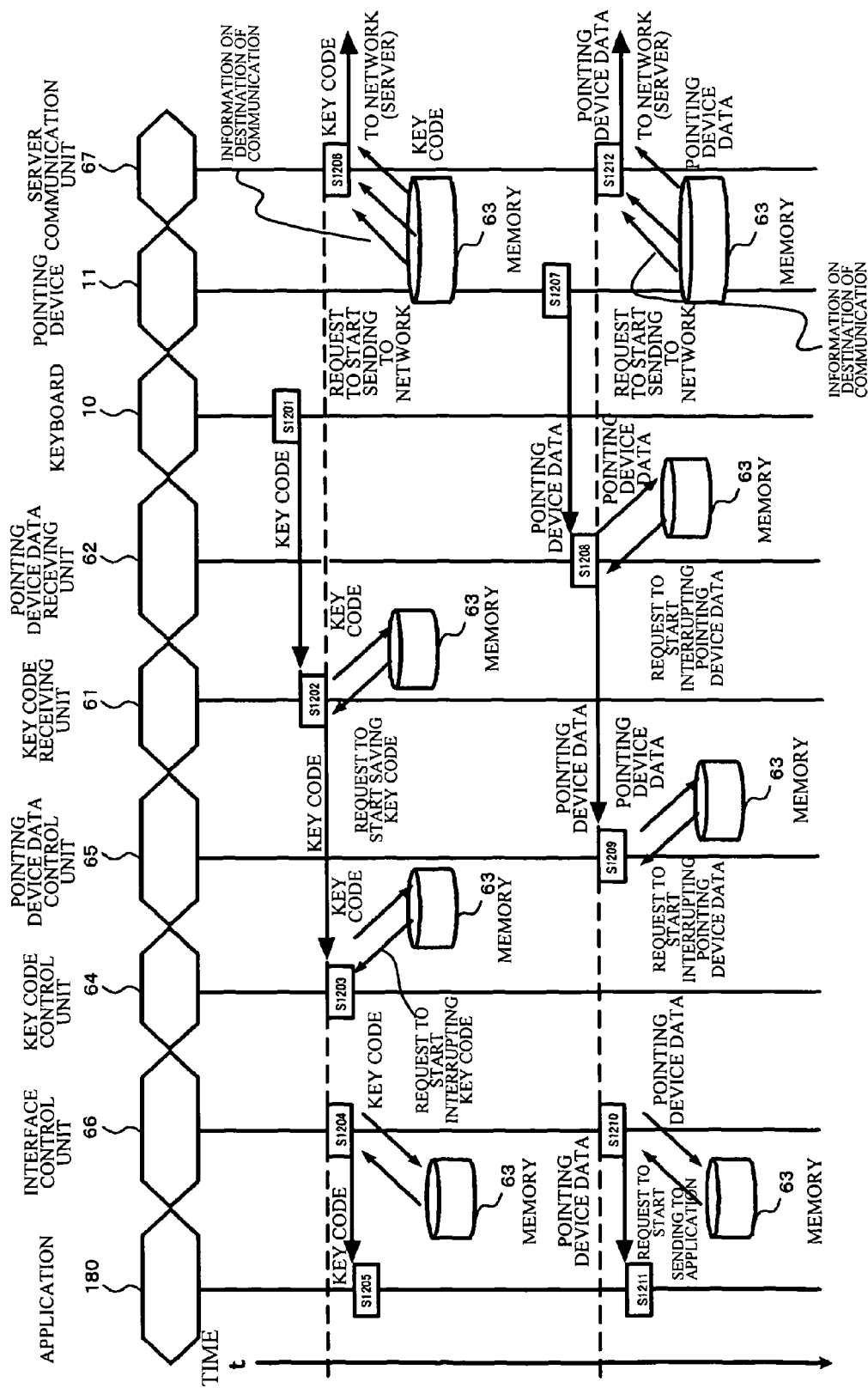
FIG. 21 illustrates another sequence of the process flow in FIG. 13.
Figure 22:
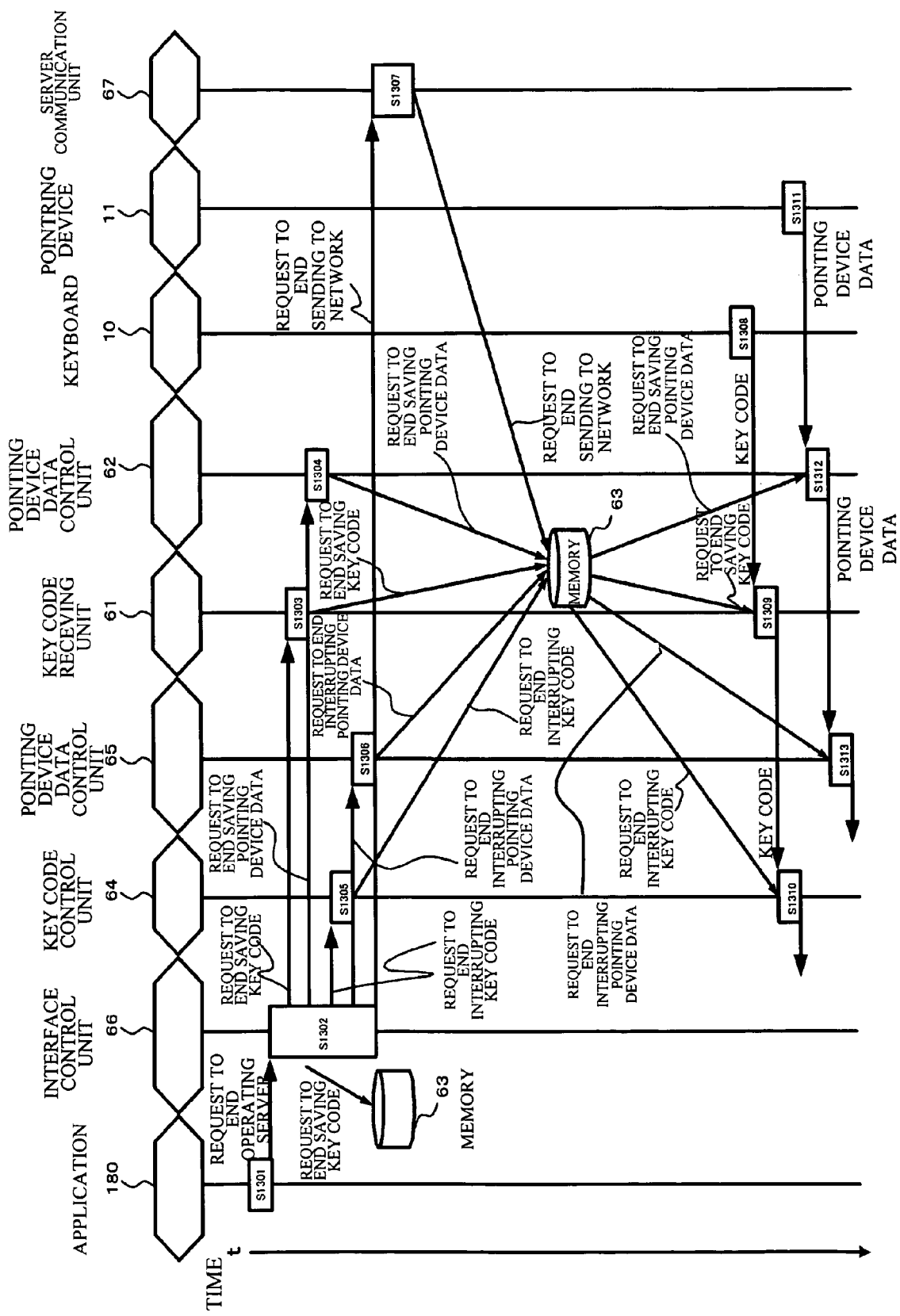
FIG. 22 illustrates another sequence of the process flow in FIG. 13.

FIG. 16 is a flowchart describing a process flow of the application 180 in operating the servers 4 through 9, which are remotely located, via the network 13. FIG. 17 is a flowchart describing a process flow for initialization process. FIG. 18 is a flowchart describing a process flow for a mouse-event generation. FIG. 19 is a flowchart describing a process flow for end process. FIGS. 20 through 22 show sequences of the processes shown in FIG. 13. In FIG. 16, a user activates the application 180 to start operating by remote control. Then, in step S0901, the application 180 performs the initialization process.

In step S1001 in FIG. 17, the application 180 reads out from the memory 181, the type of the servers 4 through 9 that are connected to the networked KVM devices 2 or 3, and displays the buttons representing the servers 4 through 9. In step S1002, the device driver 160 becomes open so that a request for instruction may be transmitted from the application 180 to the interface control unit 66 and so that the pointing device or the key code may be transmitted from the interface control unit 66 to the application 180. While the operation by remote control is being performed, the key code or the pointing device data cannot be sent to the OS 170; therefore, a user is not able move a cursor, or is not able to click any buttons of the application 180. In step S1003, by creating a thread for executing an emulation of the pointing device 11 during the operation by remote control, so as to generate a mouse event that allows an operation with a mouse. The mouse event is described in steps S1004 through S1007.

Referring back to FIG. 16, in step S0902, the application 180 stands by until the user clicks the button B. In step S0903, the application 180 checks which button B has been clicked. If the user clicks one of the buttons B of the servers 4 through 9, the application 180 reads out the communication information from the memory 181, and stores the data in the memory 63 in step S0904. The communication information corresponds to the clicked button from the servers 4 through 9. In step S0905, if the user is not operating by remote control, the application 180 sends to the interface control unit 66 in step S0906, the request to start sending to application, the request to start saving key code, the request to start saving pointing device data, the request to start interrupting key code, the request to start interrupting pointing device data, and the request to start sending to network, in step S0906 (as shown in step S1101 in FIG. 20). In step S1102, the interface control unit 66 receives the request to start sending to application, and turns into a state of sending to the application 180, the key code or the pointing device data stored in the memory 63. In step S1103, the key code receiving unit 61 receives the request to start saving key code, and is set to save the key code that has been received from the keyboard 10, in the memory 63. In step S1104, the pointing device data receiving unit 62 receives the request to start saving the pointing device data, and is set to save the pointing device data that has been received from the pointing device 11, in the memory 63.

In step S1105, the key code control unit 64 receives the request to start interrupting key code, and is set to interrupt the transmission of the key code received from the key code receiving unit 61, to the OS 170. In step S1106, the pointing device data control unit 62 receives the request to start interrupting pointing device data, and is set to interrupt the transmission of the pointing device data that has been received from the pointing device data receiving unit 62, to the OS 170.

In step S1107, the server communication unit 67 receives the request to start sending to network, and is set to send to the destination of communication stored in the memory 63, the key code or the pointing device data that has been read out from the memory 63. Here, the transmission of the key code or the pointing device data is interrupted, and the server communication unit 67 turns into a state of sending the key code or the pointing device data to the application 180 and the servers 4 through 9.

Figure 15:
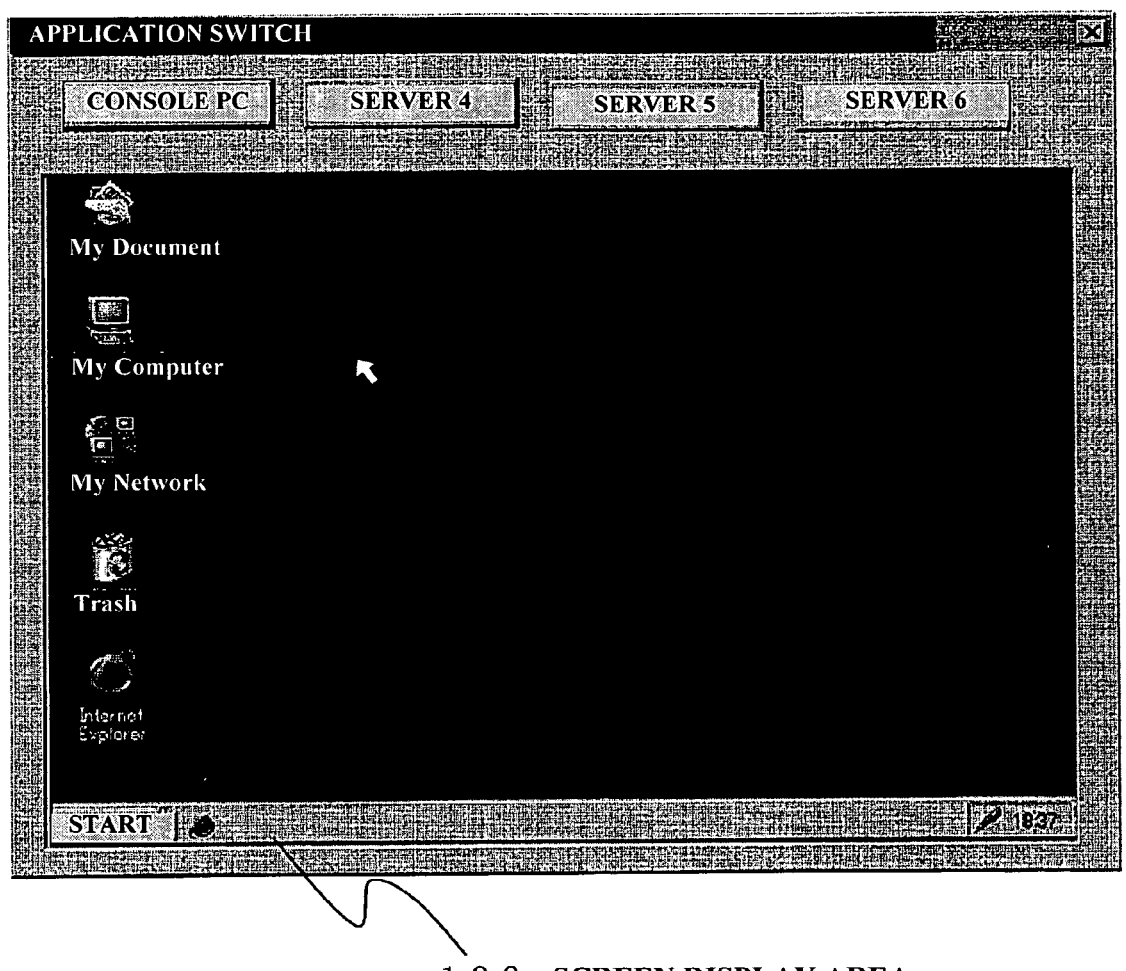
FIG. 15 shows the GUI of the application 180 operating by remote control.

Referring back to FIG. 16, in step S0907, the application 180 stores in the memory 181 that the application 180 is in a state of operation by remote control, and stands by until a user clicks a button again. FIG. 15 shows the GUI of the application 180 operating by remote control. The desktop image of a PC, which is being remotely controlled, is shown on the screen display unit 190.

A description will now be given of the key code transmission and data flow. The key code is transmitted to in order of the keyboard 10, the key code receiving unit 61, the key code control unit 64, the memory 63, the server communication unit 67, the communication device 12, the networked KVM devices 2 and 3, and the server to be operated out of the servers 4 through 9. At the same time, the key code is transmitted to in order of the keyboard 10, the key code receiving unit 61, the key code control unit 64, the memory 63, the interface control unit 66, and the application 180. The key code is also transmitted to the application 180. Thus, the key code is not transmitted to the OS 170. It is thus possible to operate the servers 4 through 9 by remote control.

In step S1201, the key code is generated by operating the keyboard 10. The key code receiving unit 61 sends the key code to the key code control unit 64 in step S1202. Due to the request to start saving key code, the key code receiving unit 61 is in a state of saving the key code, and saves the key code in the memory 63. In step S1203, the key code control unit 64 receives the key code from the key code receiving unit 61. Due to the request to start interrupting key code, the key code control unit 64 interrupts the transmission of the key code to the OS 170.

In step S1204, the interface control unit 66 reads out from the memory 63, the key code that has been stored in the memory 63, and sends to the application 180. The interface control unit 66 is in a state of sending to the application 180, due to the request to start sending to application. In step S1205, the application 180 receives the key code. In step S1206, the server communication unit 67 reads out from the memory 63, the key code stored by the key code receiving unit 61, and sends the key code to the communication device 12. The server communication unit 67 is in a state of sending to the network 13, due to the request to start sending to network.

A description will now be given of the pointing device data transmission and data flow. The pointing device data is transmitted to in order of the pointing device 11, the pointing device data receiving unit 62, the pointing device data control unit 65, the memory 63, the server communication unit 67, the communication device 12, the networked KVM devices 2 and 3, and the server to be operated out of the servers 4 through 9. At the same time, the pointing device data is transmitted to in order of the pointing device 11, the pointing device data receiving unit 62, the pointing device data control unit 65, the memory 63, the interface control unit 66, and the application 180. The pointing device data is also transmitted to the application 180. The pointing device data is not transmitted to the OS 170. It is thus possible to operate the servers 4 through 9 by remote control.

In step S1207, the pointing device data is generated by operating the pointing device 11. The pointing device data receiving unit 62 sends the pointing device data to the pointing device data control unit 65 in step S1208. Due to the request to start saving pointing device data, the pointing device data receiving unit 62 is in a state of saving the pointing device data, and saves the pointing device data in the memory 63.

In step S1209, the pointing device data control unit 65 receives the pointing device data from the pointing device data receiving unit 62. Due to the request to start interrupting pointing device data, the pointing device data control unit 65 interrupts the transmission of the pointing device data to the OS 170. In step S1210, the interface control unit 66 reads out from the memory 63, the pointing device data that has been stored in the memory 63, and sends to the application 180. The interface control unit 66 is in a state of sending to the application 180, due to the request to start sending to application.

The application 180 receives the pointing device data with the use of the thread that has been created in step S1003 in FIG. 18. At the same time, the application 180 confirms that the pointing device data has been received in step S1005, and then executes the emulation of the mouse in step S1006, based on the data obtained from the pointing device data which has been received from the interface receiving unit 66.

In step S1212, the server communication unit 67 reads out from the memory 63, the pointing device data that has been stored by the pointing device data receiving unit 62. The server communication unit 67 is in a state of sending to the network 13, due to the request to start sending to network, and sends the pointing device data to the communication device 12.

Then, the networked KVM devices 2 or 3 sends the key code or the pointing device data that has been received, to the server to be operated out of the servers 4 through 9. It is thus possible to operate by remote control. The key code or the pointing device data is not sent to the OS 170 of the console PC 151, and, the key code is not sent to any other applications that are monitoring the key code. The application 180 executes the emulation of the mouse with the use of the thread to generate the mouse event, based on the pointing device data. It is thus possible to click the button of the application 180.

In the case where a user clicks the button B of the console PC 151, the application 180 checks from the memory 181 whether the server is being operated by remote control in step S0908 in FIG. 16. If the server is being operated by remote control, the application 180, in step S0909, transmits to the interface control unit 66, the request to end sending to application, the request to end saving key code, the request to end saving pointing device data, the request to end interrupting key code, the request to end interrupting pointing device data, and the request to end sending to network (step S1301 in FIG. 22). In step S1302, the interface control unit 66 receives the request to end sending to application, and is set not to perform a transmission to the application 180. In step S1303, the key code receiving unit 61 receives the request to end saving key code, and is set not to save in the memory 63, the key code that has been received from the keyboard 10. In step S1304, the pointing device data receiving unit 62 receives the request to end saving pointing device data, and is set not to save the pointing device data in the memory 63.

In step S1305, the key code control unit 64 receives the request to end interrupting key code, and is set to send the key code to the OS 70. In step S1306, the pointing device data receiving unit 62 receives the request to end interrupting pointing device data, and is set to send the pointing device data to the OS 70. In step S1307, the server communication unit 67 receives the request to end sending to network, and is set not to transmit to the network 13.

The application 180 stores in the memory 181, that the application 180 is not in a state of operation by remote control, and stands by until a user clicks the button B again. Then, in the case where the keyboard 10 is operated, the key code receiving unit 61 receives the key code, and sends to the key code control unit 64 in step S1309 in FIG. 22. The key code control unit 64 transmits the key code to the OS 170 in step S1310. In the case where the pointing device 11 is operated, the pointing device data receiving unit 62 receives the pointing device data, and sends to the pointing device data control unit 65 in step S1312. The pointing device data control unit 65 transmits the pointing device data to the OS 170 in step S1313.

In the case where a user clicks the button B, if the server is being operated by remote control, the application 180 ends the operation by remote control as in the case where the button B on the console PC 151 is clicked, in step S0912 in FIG. 16. In step S0913, the application 180 stores in the memory 181 that the server is not being operated by remote control. In the end process, the application 180 ends the thread executing the mouse emulation while the server is being operated by remote control (in step S1007 in FIG. 19), closes the driver in step S1008, and ends communication with the interface control unit 66. In the end, the application 180 is shut down.

It is possible to send the inputted key code or the pointing device data to the networked KVM devices 2 or 3, without sending to the OS 170. In addition, it is also possible to send a special key to the networked KVM devices 2 or 3, without being affected by any other key code monitoring application. Therefore, it is possible to realize an ordinary key operation even in the operation by remote control over the network.

In accordance with the second embodiment of the present invention, it is possible to transmit the key code outputted from the keyboard 10 and the pointing device data outputted from the pointing device 11 to the networked KVM devices 2 or 3, without sending to the OS 170. In the same manner, it is possible to transmit the key code outputted from the keyboard 10 and the pointing device data outputted from the pointing device 11 to the application 180 that operates on the OS 10, without sending to the OS 170.

Thus, it is possible to transmit a special key to the servers 4 through 9 without being affected by any other key code monitoring application. It is thus possible to realize an ordinary key operation even in the operation by remote control over the network. A special key needs not to be sent with the use of GUI, and another GUI button needs not to be added.

The console PCs 51 and 151 correspond to information processing units. The device drivers 60 and 160 correspond to programs. The applications 80 and 180 correspond to applications for operation by remote control. The device drivers 60 and 160, which are programs, can be delivered with a recording or storage medium such as CD-ROM or the like. Memories 63 and 181 stand for any kind of storage medium such as RAM, ROM, CD-ROM, cache memory, memory stick, or the like. In the memories 63 and 181, at least one program is stored.

In carrying out the present invention, in an aspect of the present invention, an information processing unit for operating a server on a network by remote control, the information processing unit may include a key code receiving unit that obtains a key code outputted from a keyboard and saves the key code in a memory, before an operating system obtains the key code, a key code control unit that interrupts a transmission of the key code to the operating system, and a communication unit that transmits to the server, the key code saved in the memory.

The information processing unit in the above-mentioned aspect, may also include a pointing device data receiving unit that obtains pointing device data outputted from a pointing device and saves the pointing device data in the memory, before the operating system obtains the pointing device data, and a pointing device data control unit that interrupts a transmission of the pointing device data to the operating system, and the communication unit transmits to the server, the pointing device data saved in the memory.

The information processing unit in the above-mentioned aspect, may also include an interface control unit that transmits to an application that runs on the operating system by remote control, the key code saved in the memory.

On the information processing unit in the above-mentioned aspect, the information processing unit is a KVM device.

In another aspect of the present invention, the information processing unit for operating a server on a network by remote control, the information processing unit may include a pointing device data receiving unit that obtains pointing device data outputted from a pointing device and saves the pointing device data in a memory, before an operating system obtains the pointing device data, a pointing device data control unit that interrupts a transmission of the pointing device data to the operating system, and a communication unit that transmits to the server, the pointing device data saved in the memory.

The information processing unit in the above-mentioned aspect may also include an interface control unit that transmits to an application that runs on the operating system by remote control, the pointing device data saved in the memory.

On the information processing unit in the above-mentioned aspect, the information processing unit is a KVM device.

In another aspect of the present invention, a system may include a plurality of servers, and an information processing unit for operating the plurality of servers by remote control via a network, the information processing unit may include a key code receiving unit that obtains a key code outputted from a keyboard and saves the key code in a memory, before an operating system obtains the key code, a communication unit that transmits to the server, the key code saved in the memory, and a key code control unit that interrupts a transmission of the key code to the operating system.

In another aspect of the present invention, a system may include a plurality of servers, and an information processing unit for operating the plurality of servers by remote control via a network. The information processing unit may include a pointing device data receiving unit that obtains pointing device data outputted from a pointing device and saves the pointing device data in a memory, before an operating system obtains the pointing device data, a communication unit that transmits to the server, the pointing device data saved in the memory, and a pointing device data control unit that interrupts a transmission of the pointing device data to the operating system.

In another aspect of the present invention, an operation method of a server on a network by remote control may include the steps of obtaining a key code outputted from a keyboard to save the key code in a memory, before an operating system obtains the key code, interrupting a transmission of the key code to the operating system, and transmitting to the server, the key code saved in the memory.

The operation method of a server on a network by remote control in the above-mentioned aspect may also include the steps of obtaining pointing device data outputted from a pointing device to save the pointing device data in a memory, before an operating system obtains the pointing device data, interrupting a transmission of the pointing device data to the operating system, and transmitting to the server, the pointing device data saved in the memory.

The operation method of a server on a network by remote control in the above-mentioned aspect may also include the step of transmitting to an application that runs on an operating system by remote control, the key code saved in the memory.

In another aspect of the present invention, an operation method of a server on a network by remote control may include the steps of obtaining pointing device data outputted from a pointing device to save the pointing device data in a memory, before an operating system obtains the pointing device data, interrupting a transmission of the pointing device data to the operating system, and transmitting to the server, the pointing device data saved in the memory.

The operation method of a server on a network by remote control in the above-mentioned aspect may also include the step of transmitting to an application that runs on an operating system by remote control, the pointing device data saved in the memory.

In another aspect of the present invention, a storage medium readable by a computer to operate a server on a network by remote control, the storage medium may include means for obtaining a key code outputted from a keyboard to save the key code in a memory, before an operating system obtains the key code, means for interrupting a transmission of the key code to the operating system, and means for transmitting to the server, the key code saved in the memory.

The storage medium in the above-mentioned aspect may also include means for obtaining pointing device data outputted from a pointing device to save the pointing device data in a memory, before an operating system obtains the pointing device data, means for interrupting a transmission of the pointing device data to the operating system, and means for transmitting to the server, the pointing device data saved in the memory.

In another aspect of the present invention, a storage medium readable by a computer to operate a server on a network by remote control, the storage medium may include means for obtaining pointing device data outputted from a pointing device to save the pointing device data in a memory, before an operating system obtains the pointing device data, means for interrupting a transmission of the pointing device data to the operating system, and means for transmitting to the server, the pointing device data saved in the memory.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-041867 filed on Feb. 18, 2004 including specification, claims, drawings, and abstract is incorporated herein by reference in its entirety.

What is claimed is:

1. An information processing unit for operating a server on a network by a remote control, the information processing unit comprising:
   an output unit that outputs a request to start saving key code and a request to start interrupting key code;
   a key code receiving unit that, according to the request to start saving key code, obtains a key code input from a keyboard of the information processing unit and saves the input key code in a memory, before an operating system, which is executed in the information processing unit, obtains the input key code,
   wherein the operating system supports executing a first application for operating the server on the network by the remote control, and a second application different from the first application;
   a key code control unit that, according to the request to start interrupting key code, interrupts a transmission of the input key code to the operating system that supports execution of the first and second applications, thereby preventing the first application, which remotely operates the server, from being changed to the second application, in response to the input key code; and
   a communication unit that transmits to the server, the key code saved in the memory.

2. The information processing unit as claimed in claim 1, further comprising:
   a pointing device data receiving unit that obtains pointing device data input from a pointing device and saves the input pointing device data in the memory, before the operating system obtains the input pointing device data; and
   a pointing device data control unit that interrupts a transmission of the pointing device data to the operating system,
   wherein the communication unit transmits to the server, the input pointing device data saved in the memory.

3. The information processing unit as claimed in claim 1, further comprising an interface control unit that transmits to an application that runs on the operating system by remote control, the input key code saved in the memory.

4. The information processing unit as claimed in claim 1, wherein the information processing unit is a KVM device.

5. An information processing unit for operating a server on a network by a remote control, the information processing unit comprising:
   an output unit that outputs a request to start interrupting pointing device data and a request to start interrupting pointing device data;
   a pointing device data receiving unit that, according to the request to start saving pointing device data % obtains pointing device data input from a pointing device of the information processing unit and saves the input pointing device data in a memory, before an operating system, which is executed in the information processing unit, obtains the input pointing device data,
   wherein the operating system supports executing a first application for operating the server on the network by the remote control, and a second application different from the first application;
   a pointing device data control unit that, according to the request to start interrupting pointing device data, interrupts a transmission of the input pointing device data to the operating system that supports execution of the first and second applications, thereby preventing the first application, which remotely operates the server, from being changed to the second application, in response to the input, pointing device data; and
   a communication unit that transmits to the server, the pointing device data saved in the memory.

6. The information processing unit as claimed in claim 5, further comprising an interface control unit that transmits to an application that runs on an operating system by remote control, the input pointing device data saved in the memory.

7. The information processing unit as claimed in claim 5, wherein the information processing unit is a KVM device.

8. A system, comprising:
   a plurality of servers; and
   an information processing unit for operating the plurality of servers by a remote control via a network, the information processing unit comprising:
   an output unit that outputs a request to start saving key code and a request to start interrupting key code;

a key code receiving unit that, according to the request to start saving key code, obtains a key code input from a keyboard of the information processing unit and saves the input key code in a memory, before an operating system, which is executed in the information processing unit, obtains the input key code, wherein the operating system supports executing a first application for operating the servers on the network by the remote control, and a second application different from the first application;

a communication unit that transmits to the server, the key code saved in the memory; and a key code control unit that, according to the request to start interrupting key code, interrupts a transmission of the input key code to the operating system that supports execution of the first and second applications, thereby preventing the first application, which remotely operates the server, from being changed to the second application, in response to the key code.

9. A system, comprising:

a plurality of servers; and an information processing unit for operating the plurality of servers by a remote control via a network, the information processing unit comprising:

an output unit that outputs a request to start saving key code and a request to start interrupting key code;

a pointing device data receiving unit that, according to the request to start saving pointing device data, obtains pointing device data input from a pointing device of the information processing unit and saves the input pointing device data in a memory, before an operating system, which is executed in the information processing unit, obtains the input pointing device data, wherein the operating system supports executing a first application for operating the servers on the network by the remote control and a second application different from the first application;

a communication unit that transmits to the server, the pointing device data saved in the memory; and a pointing device data control unit that, according to the request to start interrupting pointing device data, interrupts a transmission of the input pointing device data to the operating system that supports execution of the first and second applications, thereby preventing the first application, which remotely operates the server, from being changed to the second application, in response to the input pointing device data.

10. An operation method for controlling a server on a network by a remote control, which is executed by an information processing unit comprising:

outputting a request to start saving a request to start interrupting key code;

obtaining, according to the request to start saving key code, a key code input from a keyboard of the information processing unit to save the input key code in a memory, before an operating system, which is executed in the information processing unit, obtains the input key code, wherein the operating system supports executing a first application for operating the server on the network by the remote control and a second application different from the first application;

interrupting, according to the request to start interrupting key code, a transmission of the input key code to the operating system, thereby preventing the first application, which remotely operates the server, from being changed to the second application, in response to the input key code; and transmitting to the server, the key code saved in the memory.

11. The operation method of a server on a network by remote control as claimed in claim 10, further comprising:

obtaining pointing device data input from a pointing device to save the input pointing device data in a memory, before the operating system obtains the input pointing device data;

interrupting a transmission of the input pointing device data to the operating system; and transmitting to the server, the input pointing device data saved in the memory.

12. The operation method of a server on a network by remote control as claimed in claim 10, further comprising transmitting to an application that runs on an operating system by remote control, the input key code saved in the memory.

13. An operation method for controlling a server on a network by a remote control, which is executed by an information processing unit, comprising:

outputting a request to start interrupting pointing device data and a request to start interrupting pointing device data;

obtaining, according to the request to start saving pointing device data pointing device data outputted from a pointing device of the information processing unit to save the input pointing device data in a memory, before an operating system, which is executed in the information processing unit, obtains the input pointing device data, wherein the operating system supports executing a first application for operating the servers on the network by the remote control and a second application different from the first application;

interrupting, according to the request to start interrupting pointing device data, a transmission of the input pointing device data to the operating system that su orts execution of the first and second applications, thereby preventing the first application, which remotely operates the server, from being changed to the second application, in response to the input pointing device data; and transmitting to the server, the pointing device data saved in the memory.

14. The operation method of a server on a network by remote control as claimed in claim 13, further comprising transmitting to an application that runs on an operating system by remote control, the input pointing device data saved in the memory.

15. A non-transitory storage medium readable by a computer to operate a server on a network by a remote control, the non-transitory storage medium comprising:

means for outputting a request to start saving key code and a request to start interrupting key code;

means for obtaining, according to the request to start saving key code, a key code input from a keyboard of the computer to save the input key code in a memory, before an operating system, which is executed in the computer, obtains the key code, wherein the operating system supports executing a first application for operating the server on the network by the remote control and a second application different for the first application;

means interrupting, according to the request to start interrupting key code, a transmission of the input key code to the operating system that supports execution of the first and second applications, thereby preventing the first application, which remotely operates the server, from being changed to the second application, in response to the input key code; and means for transmitting to the server, the key code saved in the memory.

16. The non-transitory storage medium as claimed in claim 15 further comprising:
   means for obtaining pointing device data input from a pointing device to save the input pointing device data in the memory, before the operating system obtains the input pointing device data;
   means for interrupting a transmission of the input pointing device data to the operating system; and
   means for transmitting to the server, the input pointing device data saved in the memory.

17. A non-transitory storage medium readable by a computer to operate a server on a network by a remote control, the non-transitory storage medium comprising:
   means for outputting a request to start interrupting pointing device data and a request to start interrupting pointing device data;
   means for obtaining, according to the request to start saving pointing device data pointing device data input from a pointing device of the computer to save the input pointing device data in a memory, before the operating system, which is executed in the computer, obtains the input pointing device data, wherein the operating system supports executing a first application for operating the server on the network by the remote control and a second application different from the first application;
   means for interrupting, according to the request to start interrupting pointing device data, a transmission of the input pointing device data to the operating system that supports execution of the first and second applications, thereby preventing the first application, which remotely operates the server, from being changed to the second application, in response to the input pointing device data; and
   means for transmitting to the server, the pointing device data saved in the memory.

* * * * *

UNITED STATES PATENT AND TRADEMARK OFFICE
CERTIFICATE OF CORRECTION

| | | |
|---|---|---|
| PATENT NO. | : 7,886,025 B2 | Page 1 of 1 |
| APPLICATION NO. | : 11/039944 | |
| DATED | : February 8, 2011 | |
| INVENTOR(S) | : Shinichi Katayama et al. | |

It is certified that error appears in the above-identified patent and that said Letters Patent is hereby corrected as shown below:

Column 22, Line 35 in Claim 5, delete "%" and insert -- , --, therefor.

Column 22, Line 52 in Claim 5, after "input" delete ",".

Column 23, Line 51 in Claim 10, after "saving" insert -- key code and --.

Column 24, Line 25 in Claim 13, after "data" insert -- , --.

Column 24, Line 25 in Claim 13, delete "outputted" and insert -- input --, therefor.

Column 24, Line 36 in Claim 13, delete "su orts" and insert -- supports --, therefor.

Column 24, Line 61 in Claim 15, delete "means interrupting" and insert -- means for interrupting --, therefor.

Column 25, Line 20 in Claim 17, delete "data pointing" and insert -- data, pointing --, therefor.

Signed and Sealed this
Twenty-sixth Day of April, 2011

David J. Kappos
*Director of the United States Patent and Trademark Office*